US012591788B1

(12) United States Patent
Tang et al.

(10) Patent No.: US 12,591,788 B1
(45) Date of Patent: *Mar. 31, 2026

(54) SYSTEMS AND METHODS FOR GENERATING AND IMPLEMENTING KNOWLEDGE GRAPHS FOR KNOWLEDGE REPRESENTATION AND ANALYSIS

(71) Applicant: FEDERAL HOME LOAN MORTGAGE CORPORATION (FREDDIE MAC), McLean, VA (US)

(72) Inventors: Yuang Tang, Baltimore, MD (US); Fabio Quijada, Reston, VA (US); Dylan Nielson, Washington, DC (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,523

(22) Filed: Nov. 6, 2023

Related U.S. Application Data

(60) Division of application No. 16/224,786, filed on Dec. 18, 2018, now Pat. No. 11,810,001, which is a (Continued)

(51) Int. Cl.
*G06N 5/02* (2023.01)
*G06F 16/9032* (2019.01)
(Continued)

(52) U.S. Cl.
CPC .......... *G06N 5/02* (2013.01); *G06F 16/9032* (2019.01); *G06F 17/18* (2013.01); *G06F 18/231* (2023.01); *G06N 20/00* (2019.01)

(58) Field of Classification Search
CPC ...... G06N 5/02; G06N 20/00; G06F 16/9032; G06F 18/231; G06F 17/18
See application file for complete search history.

(56) References Cited

U.S. PATENT DOCUMENTS

| | | |
|---|---|---|
| 6,178,406 B1 | 1/2001 | Cheetham et al. |
| 8,140,421 B1 * | 3/2012 | Humphries ............ G06Q 50/16 705/40 |

(Continued)

*Primary Examiner* — Jensen Hu
(74) *Attorney, Agent, or Firm* — FINNEGAN, HENDERSON, FARABOW, GARRETT & DUNNER, LLP

(57) ABSTRACT

This disclosure relates to knowledge generation and implementation. A knowledge graph system comprises at least one processor, at least one database communicatively connected to the at least one processor, and a memory storing executable instructions. When executed, the instructions cause the at least one processor to aggregate data associated with a plurality of entities, the aggregated data reflecting one or more relationships between two or more of the plurality of entities. Attribute data identifying loan amounts, property values, and appraisal sources may be extracted from the aggregated data. A knowledge graph data structure may be generated having a plurality of subject notes corresponding to the extracted attribute information. Statistical distributions of attributes associated with one or more appraisal sources may be generated and an anomaly in a first statistical distribution may be detected based on a comparison of the first statistical distribution with a second statistical distribution.

20 Claims, 29 Drawing Sheets

100

Related U.S. Application Data continuation-in-part of application No. 15/593,113, filed on May 11, 2017, now Pat. No. 10,496,678.

(60) Provisional application No. 62/335,580, filed on May 12, 2016.

(51) Int. Cl.

| | | |
|---|---|---|
| *G06F 17/18* | (2006.01) |
| *G06F 18/231* | (2023.01) |
| *G06N 20/00* | (2019.01) |

(56) References Cited

U.S. PATENT DOCUMENTS

| | | | | |
|---|---|---|---|---|
| 8,732,219 | B1* | 5/2014 | Ferries | G06F 16/56 |
| | | | | 707/723 |
| 2001/0039506 | A1 | 11/2001 | Robbins | |
| 2002/0091923 | A1* | 7/2002 | Chipman | G06F 16/954 |
| | | | | 713/168 |
| 2005/0108025 | A1* | 5/2005 | Cagan | G06Q 30/0278 |
| | | | | 705/38 |
| 2005/0192930 | A1 | 9/2005 | Hightower et al. | |
| 2006/0015263 | A1* | 1/2006 | Stupp | G06F 17/18 |
| | | | | 702/19 |
| 2010/0076794 | A1* | 3/2010 | Seippel | G06Q 30/0601 |
| | | | | 705/28 |
| 2011/0173116 | A1 | 7/2011 | Yan et al. | |
| 2012/0158633 | A1 | 6/2012 | Eder | |
| 2012/0278321 | A1 | 11/2012 | Traub et al. | |
| 2012/0323799 | A1* | 12/2012 | Treadwell | G06Q 30/02 |
| | | | | 705/306 |
| 2013/0051650 | A1* | 2/2013 | Santamaria-Pang | G16B 40/20 |
| | | | | 382/133 |
| 2013/0080340 | A1 | 3/2013 | Onmus-Baykal et al. | |
| 2013/0132287 | A1 | 5/2013 | Yao et al. | |
| 2013/0195327 | A1* | 8/2013 | Tanji | G06T 5/70 |
| | | | | 382/128 |
| 2014/0280307 | A1 | 9/2014 | Gupta et al. | |
| 2014/0334667 | A1* | 11/2014 | Eswara | G06T 7/168 |
| | | | | 382/103 |
| 2014/0372346 | A1* | 12/2014 | Phillipps | G06N 20/00 |
| | | | | 706/12 |
| 2015/0201895 | A1* | 7/2015 | Suzuki | A61B 6/032 |
| | | | | 382/131 |
| 2016/0259841 | A1* | 9/2016 | Andrew | G06Q 50/16 |
| 2019/0101402 | A1 | 4/2019 | Chien et al. | |

* cited by examiner

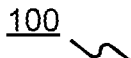
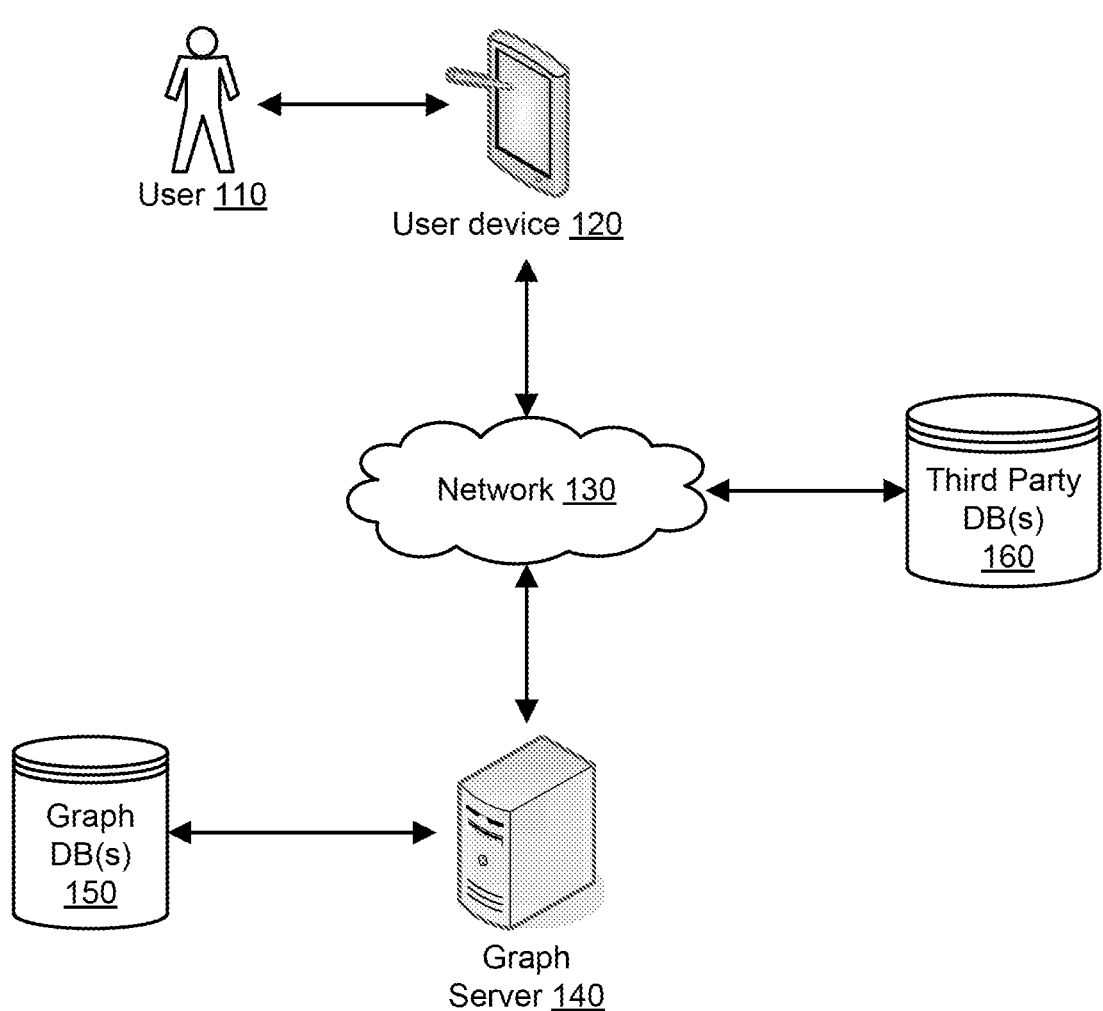
FIG. 1

200

400

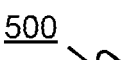
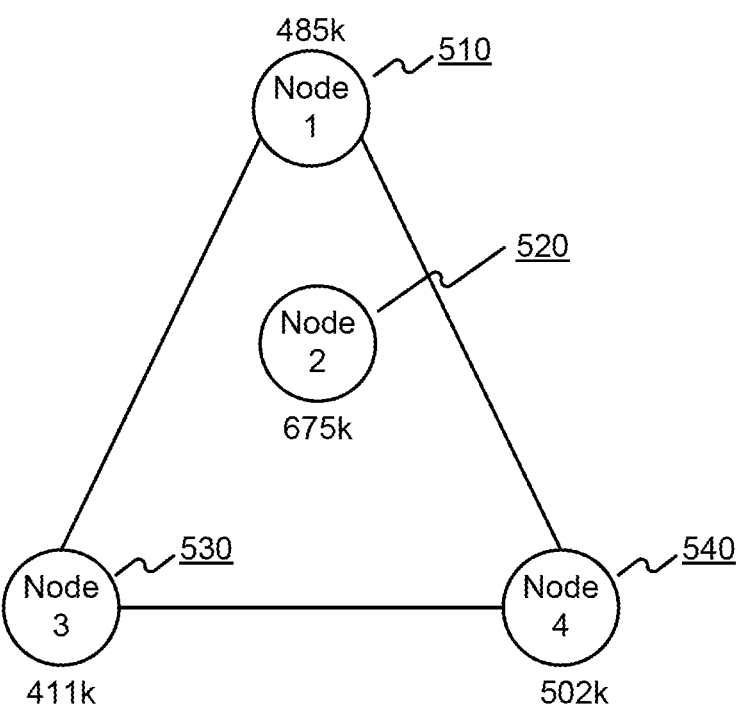
FIG. 5

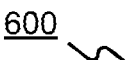
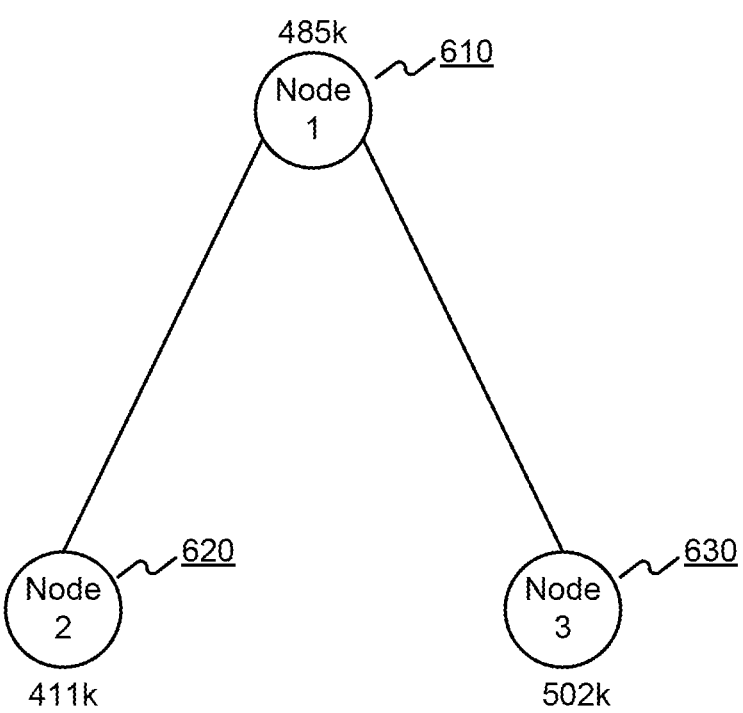
FIG. 6

700

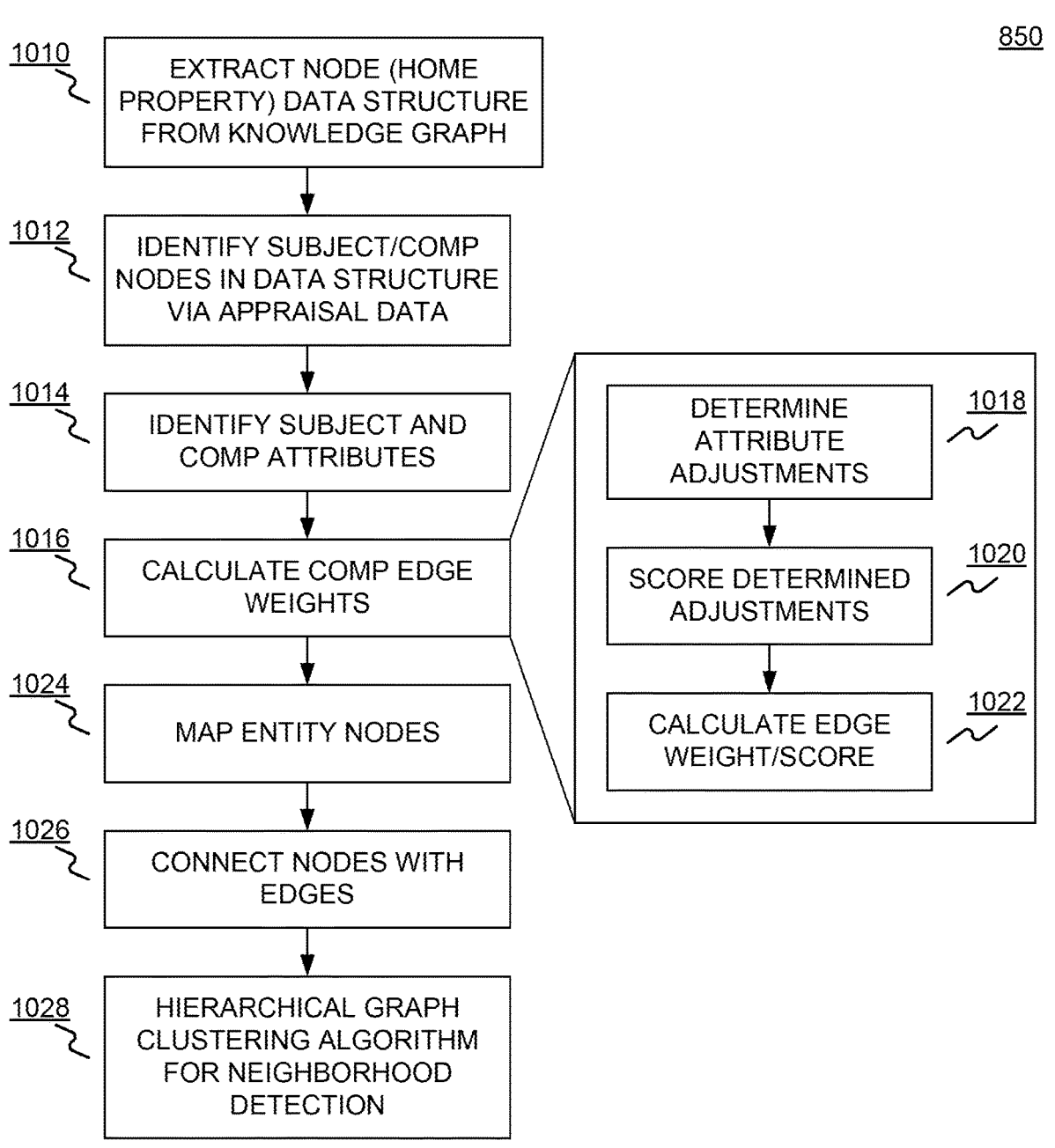

850

1010 — EXTRACT NODE (HOME PROPERTY) DATA STRUCTURE FROM KNOWLEDGE GRAPH

1012 — IDENTIFY SUBJECT/COMP NODES IN DATA STRUCTURE VIA APPRAISAL DATA

1014 — IDENTIFY SUBJECT AND COMP ATTRIBUTES

1016 — CALCULATE COMP EDGE WEIGHTS

1018 — DETERMINE ATTRIBUTE ADJUSTMENTS

1020 — SCORE DETERMINED ADJUSTMENTS

1022 — CALCULATE EDGE WEIGHT/SCORE

1024 — MAP ENTITY NODES

1026 — CONNECT NODES WITH EDGES

1028 — HIERARCHICAL GRAPH CLUSTERING ALGORITHM FOR NEIGHBORHOOD DETECTION

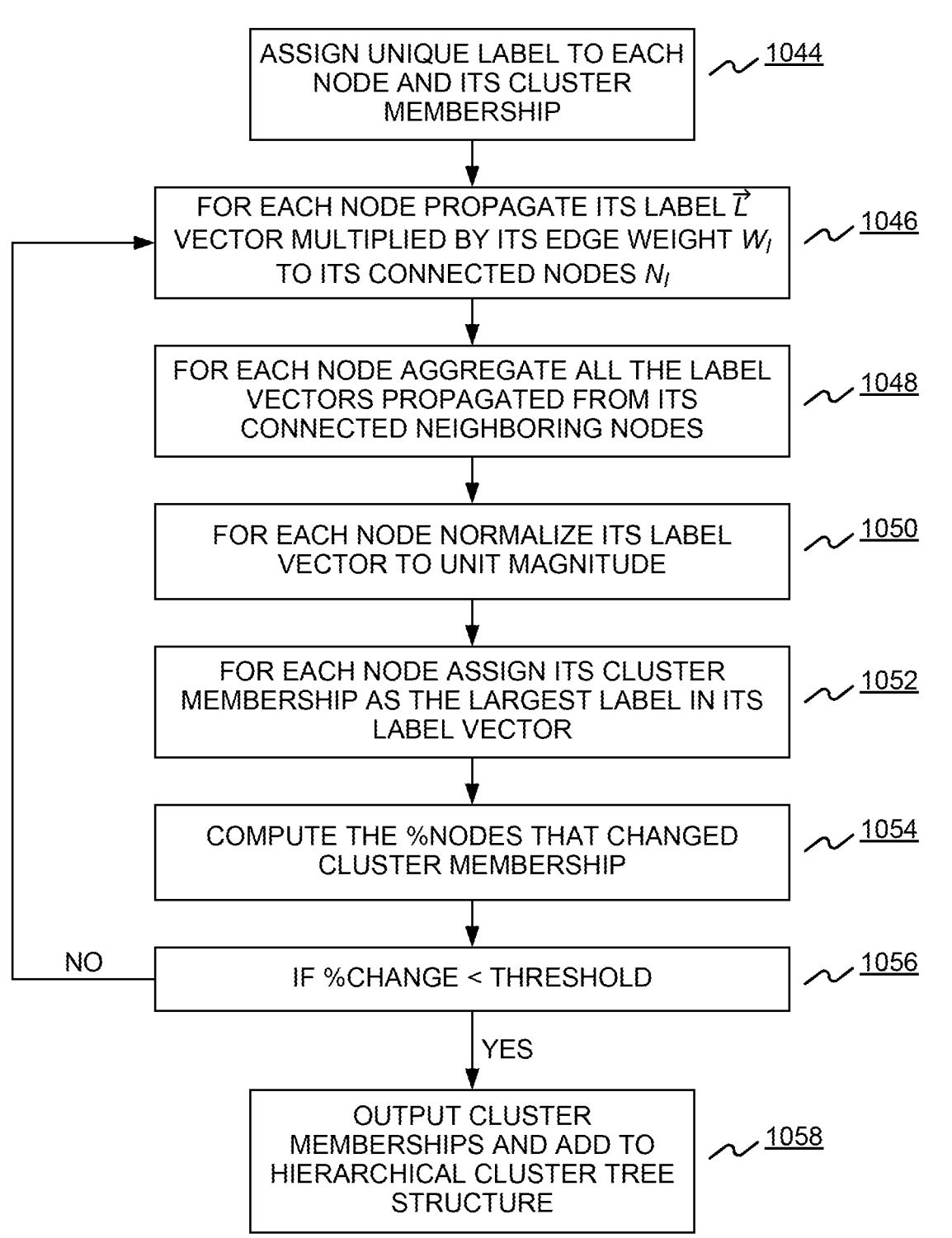

ASSIGN UNIQUE LABEL TO EACH NODE AND ITS CLUSTER MEMBERSHIP    1044

FOR EACH NODE PROPAGATE ITS LABEL $\vec{L}$ VECTOR MULTIPLIED BY ITS EDGE WEIGHT $W_l$ TO ITS CONNECTED NODES $N_l$    1046

FOR EACH NODE AGGREGATE ALL THE LABEL VECTORS PROPAGATED FROM ITS CONNECTED NEIGHBORING NODES    1048

FOR EACH NODE NORMALIZE ITS LABEL VECTOR TO UNIT MAGNITUDE    1050

FOR EACH NODE ASSIGN ITS CLUSTER MEMBERSHIP AS THE LARGEST LABEL IN ITS LABEL VECTOR    1052

COMPUTE THE %NODES THAT CHANGED CLUSTER MEMBERSHIP    1054

IF %CHANGE < THRESHOLD    1056

NO

YES

OUTPUT CLUSTER MEMBERSHIPS AND ADD TO HIERARCHICAL CLUSTER TREE STRUCTURE    1058

FIG. 10C

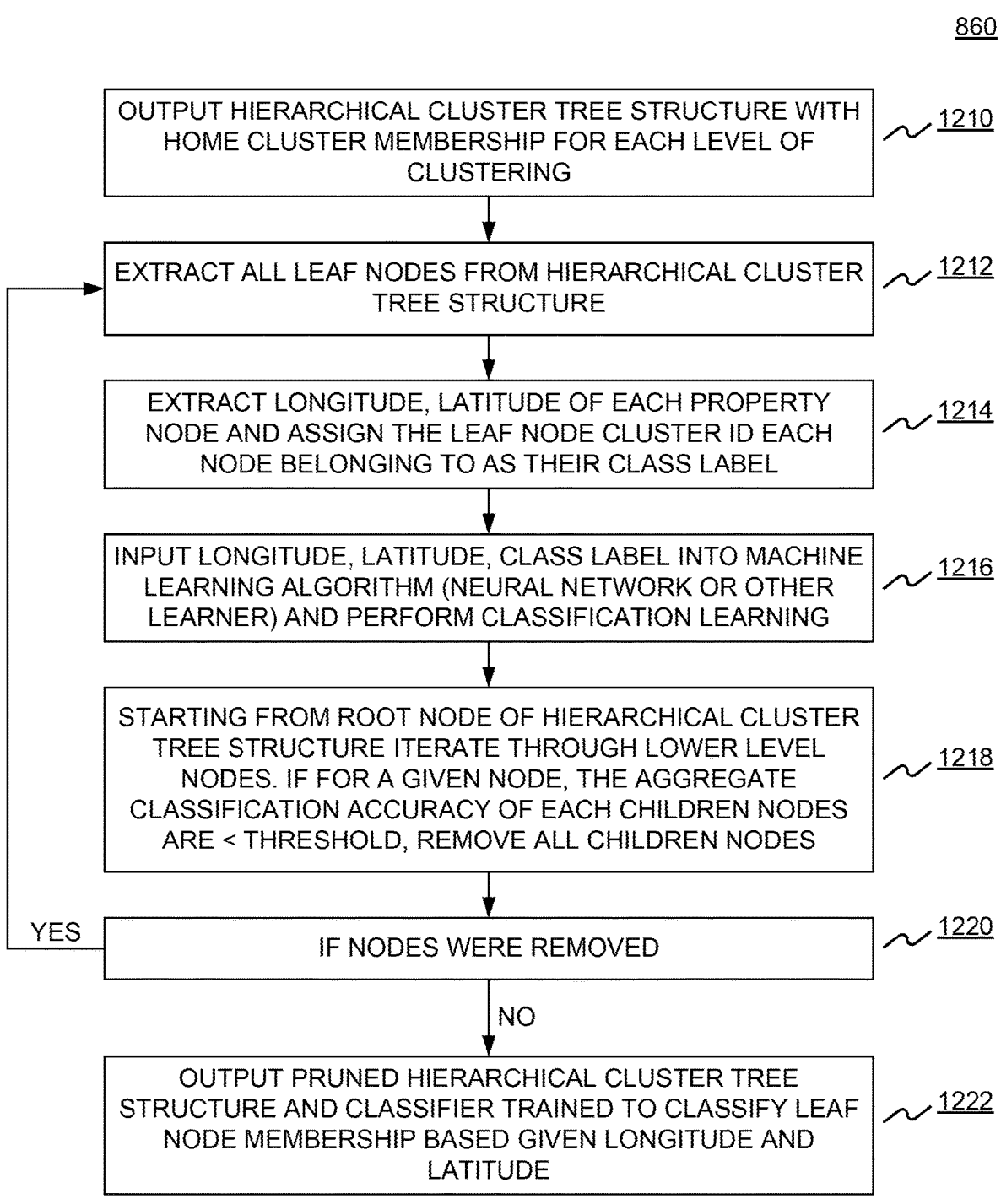

860

OUTPUT HIERARCHICAL CLUSTER TREE STRUCTURE WITH HOME CLUSTER MEMBERSHIP FOR EACH LEVEL OF CLUSTERING ~1210

EXTRACT ALL LEAF NODES FROM HIERARCHICAL CLUSTER TREE STRUCTURE ~1212

EXTRACT LONGITUDE, LATITUDE OF EACH PROPERTY NODE AND ASSIGN THE LEAF NODE CLUSTER ID EACH NODE BELONGING TO AS THEIR CLASS LABEL ~1214

INPUT LONGITUDE, LATITUDE, CLASS LABEL INTO MACHINE LEARNING ALGORITHM (NEURAL NETWORK OR OTHER LEARNER) AND PERFORM CLASSIFICATION LEARNING ~1216

STARTING FROM ROOT NODE OF HIERARCHICAL CLUSTER TREE STRUCTURE ITERATE THROUGH LOWER LEVEL NODES. IF FOR A GIVEN NODE, THE AGGREGATE CLASSIFICATION ACCURACY OF EACH CHILDREN NODES ARE < THRESHOLD, REMOVE ALL CHILDREN NODES ~1218

IF NODES WERE REMOVED ~1220

YES

NO

OUTPUT PRUNED HIERARCHICAL CLUSTER TREE STRUCTURE AND CLASSIFIER TRAINED TO CLASSIFY LEAF NODE MEMBERSHIP BASED GIVEN LONGITUDE AND LATITUDE ~1222

1410   RECEIVE GRAPH TRAVERSAL QUERY

1412   IDENTIFY GRAPH NODES AND EDGES ASSOCIATED WITH TRAVERSAL QUERY

1414   GENERATE QUERY RESPONSE BASED ON GRAPH TRAVERSAL

1416   IDENTIFY ANOMALY NODE IN QUERY RESPONSE  →  PROVIDE ANOMALY INDICATION   1420

1418   PROVIDE APPRAISAL COMPUTATION

<u>1528</u>

BASE LEVEL OF SUBJECT NODES/ LOAN EDGES   <u>1530</u>

GRAPH CLUSTERING ALGORITHM   <u>1532</u>

| CLUSTER 1 | CLUSTER 4 |
|---|---|
| CLUSTER 2 | CLUSTER 3 |

<u>1534</u>

<u>1536-1</u>

<u>1536-2</u>

<u>1536-3</u>

<u>1536-4</u>

BASE LEVEL OF SUBJECT NODES/LOAN EDGES

BASE LEVEL OF SUBJECT NODES/LOAN EDGES

BASE LEVEL OF SUBJECT NODES/LOAN EDGES

BASE LEVEL OF SUBJECT NODES/LOAN EDGES

<u>1538-1</u>

<u>1538-2</u>

<u>1538-3</u>

<u>1538-4</u>

GRAPH CLUSTERING ALGORITHM

GRAPH CLUSTERING ALGORITHM

GRAPH CLUSTERING ALGORITHM

GRAPH CLUSTERING ALGORITHM

<u>1540-1</u>

<u>1540-2</u>

<u>1540-3</u>

<u>1540-4</u>

| CLUSTER 5 | CLUSTER 6 |
|---|---|
| CLUSTER 7 | CLUSTER 8 |

| CLUSTER 9 | CLUSTER 10 |
|---|---|
| CLUSTER 11 | CLUSTER 12 |

| CLUSTER 13 | CLUSTER 14 |
|---|---|
| CLUSTER 15 | CLUSTER 16 |

| CLUSTER 17 | CLUSTER 18 |
|---|---|
| CLUSTER 19 | CLUSTER 20 |

OUTPUT HIERARCHICAL CLUSTER TREE STRUCTURE WITH HOME CLUSTER MEMBERSHIP FOR EACH LEVEL OF CLUSTERING   <u>1542</u>

FIG. 15B

SYSTEMS AND METHODS FOR GENERATING AND IMPLEMENTING KNOWLEDGE GRAPHS FOR KNOWLEDGE REPRESENTATION AND ANALYSIS

PRIORITY CLAIM

This application is a division of U.S. patent application Ser. No. 16/224,786 (now allowed), filed on Dec. 18, 2018, which is a continuation-in-part of U.S. patent application Ser. No. 15/593,113 (now U.S. Pat. No. 10,496,678), filed on May 11, 2017, which claims priority under 35 U.S.C. § 119 to U.S. Provisional Application No. 62/335,580, filed on May 12, 2016. The content of the above-referenced applications are expressly incorporated herein by reference in their entireties.

TECHNICAL FIELD

This disclosure relates generally to knowledge graph generation and implementation, and more particularly to systems and methods for building knowledge graphs for knowledge representation and reasoning techniques associated with property data.

BACKGROUND

Multiple computer systems exist to determine property values, and these current systems are used in modern housing industries for property evaluation and setting prices. Automated valuation models for real estate appraisal typically rely on statistical models such as multiple regression analysis or geographic information systems (GIS). These systems, while widely used, suffer from multiple technical problems that ultimately result in incomplete or inaccurate property value data. The inventor here has recognized several technical problems with such conventional systems, as explained below.

First, current systems determine property value largely based on the average values for a zip code or other pre-defined neighborhood (such as a county, town, or subdivision). For example, multiple websites exist that allow a user to enter a street address of a property, and the website system estimates a value of the property based on average values for the entered zip code or predefined neighborhood where the property sits. While convenient, these conventional automated valuation models produce inaccurate results when they are used in certain neighborhoods. Many properties are included in these calculations solely because they are in the same general geographic area or zip code, and the resulting values can be very inaccurate when the appraised property does not conform well to the zip code or predefined neighborhood in which it resides. Indeed, many attributes that can differ between properties located in the same zip code or predefined neighborhood, in rural and city areas alike.

Second, current systems rely on traditional relational databases, such as SQL databases and lookup tables. The data architectures underlying such systems is inadequate for storing complex relationships between multiple entities. As a result, traditional relational databases are not technically suited for valuation modeling because of the limited nature of queries that can be executing on such databases. Even where a particular target query can theoretically be constructed from multiple queries on a relational database, multiple query results may need to be combined to acquire the data set necessary for valuation modeling, the database retrieval delays may be large, and additional computational overhead may be needed to combine the query results in a manner relevant to executing the automated valuation models.

As another example, relational databases typically store individual information about the relationships between any two given entities. When new entities and/or relationships are added, database entries grow exponentially to store all new relationships between individual entity pairs. At the scale required in current systems, the storage and computation requirements for maintaining and updating relational databases are unsustainable. Thus, traditional relational database architectures are unsuitable for use in a dynamic system having multiple complex relationships between entities. Such databases are not well suited to representing integrated collections of facts and relationships included in the real estate big data sets, or to extracting, analyzing or manipulating such large data sets in a manner relevant to valuation modeling. Such relational databases are also inefficient for constructing queries for identifying real estate properties similar to other properties, a common type of query in this field.

Traditional relational databases are inefficient for detected anomalies probative of suspicious or fraudulent behavior because of the complexity of relationship between data structures and entities. Difficulties in identifying markers of suspicious activity also exacerbates the frequency with which fraud is perpetrated. In some fraud schemes, a loan originator may conspire with an appraisal source to inflate an appraisal value of a property. The originator may then assist a borrower in securing a loan based on the inflated appraisal value. In other schemes, a borrower may acquire a refinancing loan based on the inflated appraisal value. The loan may be issued to the borrow based on an inflated loan to value (LTV) ratio that is much higher than an actual LTV. The actual LTV may be based on the actual value of the home, rather than the inflated appraisal value. Loans based on an inflated LTV may be more susceptible to default, or subject to loan terms unfavorable to a lender.

The traditional relational databases are also ineffective for identifying outliers or anomalies, due to the need for a myriad of complex SQL queries to analyze data associated with multiple entities and relationships involved in loan origination, and due to difficulties in normalizing differences in data values for varying attributes to identify localizations within the data.

In view of the technical problems discussed above, there exists a need for technological improvements to current systems.

SUMMARY

Disclosed embodiments present technological improvements as technical solutions to one or more of the above-mentioned technical problems recognized by the inventors in conventional systems. More particularly, disclosed embodiments address technical problems in current systems using knowledge graph technology in a manner not previously used in home valuation computer systems. Thus, the disclosed embodiments build new types of knowledge graphs using data that is aggregated from multiple networked sources, interpreted, and used to build knowledge graph data structures. Thus, the disclosed embodiments utilize data in techniques not previously applied in home industries, to generate knowledge graph-based models that overcome previous technical problems while increasing home valuation accuracy and utility.

In one embodiment, a knowledge graph computer system is disclosed, comprising at least one processor, at least one database communicatively connected to the at least one processor, and a memory storing executable instructions. When executed, the instructions may cause the at least one processor to perform operations including: aggregating, from the at least one database, entity data for a plurality of home; extracting, from the aggregated data, attribute information identifying geographic locations of the plurality of homes, and relationships between pairs of the plurality of homes; populating knowledge graph data structures with the extracted attribute information; building a home knowledge graph having nodes corresponding to the plurality of homes and edges corresponding to the identified relationships; and outputting a hierarchical cluster tree structure of the plurality of homes, wherein levels of the hierarchical cluster tree correspond to clusters of homes determined based in part on the knowledge graph edges.

In another embodiment, another knowledge graph computer system is disclosed, comprising: at least one processor, at least one database communicatively connected to the at least one processor, and a memory storing executable instructions. When executed, the stored instructions may cause the at least one processor to perform operations including: receiving, from the at least one database, knowledge graph data structures with node data and edge data, the node data corresponding to a plurality of homes, and the edge data corresponding to identified relationships between the plurality of homes; building a home knowledge graph having nodes and edges based on the node data and the edge data, the home knowledge graph having a hierarchical cluster tree structure of the plurality of homes, wherein levels of the hierarchical cluster tree correspond to clusters of homes determined based in part on the knowledge graph edges; identifying a first cluster of homes associated with a first level of the hierarchical cluster tree structure; determining, for each home in the first cluster, at least one vector proportionate to a first edge weight associated with the respective home; normalizing the determined vectors; identifying, based on the normalized vectors, a number of homes of the first cluster that are no longer associated with the first cluster; and responsive to a determination that the identified number of homes is below a predetermined threshold, assigning the identified homes to a second cluster, and adding the second cluster to the hierarchical cluster tree structure.

In a first exemplary embodiment, a knowledge graph computer system is disclosed. The system may comprise at least one processor, at least one database communicatively connected to the at least one processor, and a memory storing executable instructions which, when executed, cause the at least one processor to perform operations. The operations may include aggregating, from the at least one database, data associated with a plurality of entities, the aggregated data reflecting one or more relationships between two or more of the plurality of entities, extracting, from the aggregated data, attribute information identifying loan amounts, property values, and appraisal sources, populating one or more data structures with the extracted attribute information, generating a knowledge graph data structure having a plurality of subject nodes corresponding to the plurality of entities and a plurality of loan nodes corresponding to the extracted attribute information, generating a first statistical distribution of first attributes associated with a first appraisal source and a second statistical distribution of second attributes associated with a second appraisal source, and detecting an anomaly in the first statistical distribution based on a comparison of the first statistical distribution and the second statistical distribution.

In another exemplary embodiment, non-transitory computer readable medium storing instructions is disclosed. The instructions, when executed, may cause at least one processor to perform operations. The operations may comprise aggregating, from the at least one database, entity data for a plurality of subjects, the plurality of subjects representing loan originators, extracting, from the aggregated data, attribute information identifying a loan amount, a property value, an appraisal source, populating one or more data structures with the extracted attribute information, building a knowledge graph having a plurality of subject nodes corresponding to the plurality of subjects and a plurality of loan nodes corresponding to the attribute information, outputting a hierarchical cluster tree structure of the plurality of subject nodes, wherein levels of the hierarchical cluster tree correspond to clusters of subject nodes determined based in part on knowledge graph edges.

In another exemplary embodiment, a knowledge graph computer system is disclosed. The system may comprise at least one processor, at least one database communicatively connected to the at least one processor, and a memory storing executable instructions which, when executed, cause the at least one processor to perform operations. The operations may include building a knowledge graph having a plurality of subject nodes corresponding to the plurality of subjects and a plurality of loan nodes corresponding to the attribute information, identifying a first cluster of subject nodes associated with a first level of the hierarchical cluster tree structure, determining, for each subject node in the first cluster, at least one vector proportionate to a first loan edge weight associated a respective property, identifying a first subcluster of subject nodes associated with the first cluster of the hierarchical cluster tree structure, and determining, for each loan node in the first subcluster, at least one vector proportionate to a first neighbor edge weight associated with the respective subject node.

In other embodiments, non-transitory computer readable media are disclosed having stored thereon computer-executable instructions for configuring the systems and performing the methods disclosed herein.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates an exemplary home knowledge graph representation and analysis system according to some embodiments of the present disclosure.

FIGS. 2-7 are functional block diagrams depicting exemplary aspects of some embodiments of the present disclosure.

FIG. 10A shows a flowchart of an exemplary subroutine for determining entity clusters, consistent with disclosed embodiments.

FIG. 10C shows a flowchart of an exemplary subroutine for a graph clustering algorithm, consistent with disclosed embodiments.

FIG. 12 shows a flowchart of an exemplary subroutine for geo-spatial neighborhood delineation and denoising using machine learning, consistent with disclosed embodiments.

FIG. 15B shows a flowchart of an exemplary subroutine for generating a hierarchical cluster tree structure for a subject node and edges, consistent with disclosed embodiments.

DETAILED DESCRIPTION OF EXEMPLARY EMBODIMENTS

Figure 2:
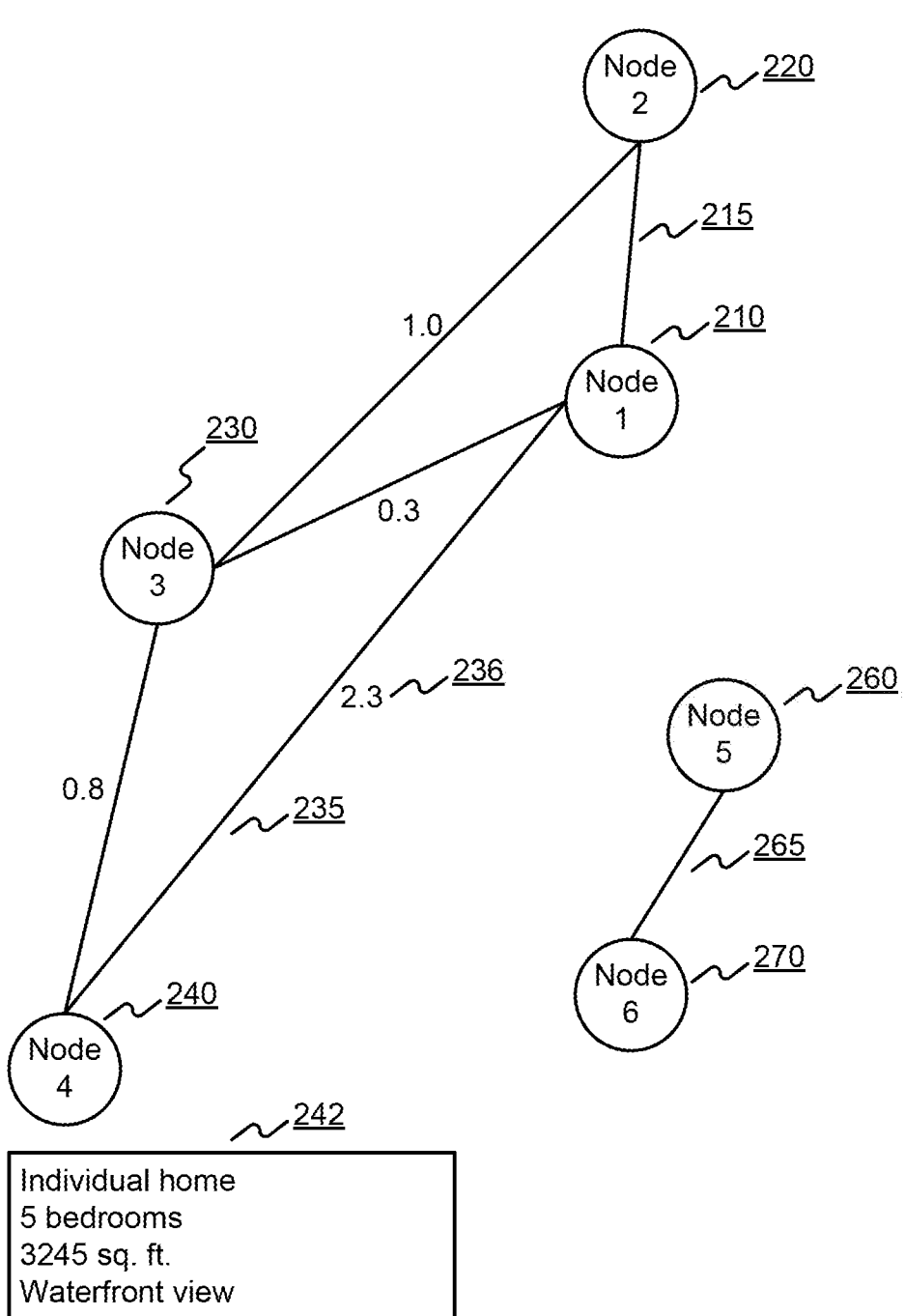

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

FIG. 1 illustrates an exemplary home knowledge graph representation and analysis system 100 according to some embodiments of the present disclosure. System 100 may be configured to perform one or more software processes that, when executed by one or more processors, perform methods consistent with disclosed embodiments. The components and arrangements shown in FIG. 1 are not intended to limit the disclosed embodiments, as the components used to implement the disclosed processes and features may vary.

In accordance with disclosed embodiments, system 100 may include one or more users 110, one or more user devices 120, a network 130, a graph server 140, and a graph database 150. Facility terminal 140 may be a standalone device placed in user 110's office, an employee station, or an alternative central location in a workplace. In some embodiments, terminal 140 may be a desktop or notebook computer, a flat panel or projected display, or any other display.

User 110 may be an employee in a workplace environment such as a nurse, a technician, a salesperson, or a customer service representative. User 110 may operate user device 120 or another computer (not shown) to interact with system 100.

User device 120 may be a personal computing device such as, for example, a general purpose or notebook computer, a mobile device with computing ability, a tablet, smartphone, wearable device such as Google Glass™ or smart watches, or any combination of these computers and/or affiliated components. In one embodiment, user device 120 may be a computer system or mobile computer device that is operated by user 110.

User device 120 may be connected to graph server 140 via a combination of one or more of local networks and/or network 130. Other components known to one of ordinary skill in the art may be included in system 100 to gather, process, transmit, receive, and provide account information consistent with the disclosed embodiments.

Graph server 140 may be operated by a facility such as a real estate appraiser, agent, service provider, and the like. Graph server 140 may be a computer-based system including computer system components, desktop computers, workstations, tablets, hand held computing devices, memory devices, and/or internal network(s) connecting the components.

Network 130 may comprise any type of computer networking arrangement used to exchange data. For example, network 130 may be the Internet, a private data network, virtual private network using a public network, and/or other suitable connection(s) that enables system 100 to send and receive information between the components of system 100. Network 130 may also include a public switched telephone network ("PSTN") and/or a wireless network.

Network 130 may include a local network comprising any type of computer networking arrangement used to exchange data in a localized area, such as WiFi, Bluetooth™, Ethernet, and other suitable short-range connections that enable user device 120 to send and receive information between the components of system 100. In some embodiments, local network may be excluded, and user device 120 may communicate with system 100 components via the remainder of network 130. In some embodiments, user device 120 may communicate with one or more system 100 components via a direct wired or wireless connection.

Graph database 150 may store information in the form of a graph structure. Graph database 150 may be implemented using, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

FIGS. 2-7 are functional block diagrams depicting exemplary aspects of some embodiments of the present disclosure. With reference to FIG. 2, in some embodiments, a graph structure 200 implemented by system 100 may include node 1 (210), node 2 (220), node 3 (230), node 4 (240), node 5 (260), and node 6 (270). Such nodes may represent any combination of properties (e.g., real estate lots, homes, etc.), or any field, property, or value associated with such property nodes (e.g., appraisal value, last sale price, number of bedrooms, number of bathrooms, area, flags indicating whether the property is a corner property, waterfront property, one having a view, etc.), collectively referred to as "attributes." For example, the graph 200 may be generated using appraisal data, buyer information, seller information, mortgage insurer, servicer etc. For example, with reference to FIG. 7, in some embodiments, graph 200 may include nodes such as property nodes 1-3 (710, 720, 730), buyer node (740), servicer node (750) representing a service provider, a seller node (760), representing a seller, and/or the like. As discussed below, in some embodiments server 140 may aggregate these types of data by generating and transmitting queries to one or more networked or local databases associated with the respective data types, or to external systems maintained by government or private entities associated with the respective data types.

For example, by leveraging the data, properties and attributes, system 100 may identify comparable homes issued by appraisers as associations (edges) to build a graph data structure where the nodes are the properties or attributes, and edges (e.g., 215, 235, 265) exist between properties or attributes that are appraised as comparable ("comps") or related, with some particular weight or strength of relationship (e.g., 236). Each property node may store all relevant information 242 for the property such as Price, Number of bedrooms, Number of bathrooms, Square footage and other like data fields. Each edge can have a weight/score that determines how strong the similarity is between the two nodes that it connects. In some embodiments, this weight square can range from 0 to 1, and can take many factors into account such as the adjustments made on the appraisal, the freshness of the appraisal, etc.

Figure 3:
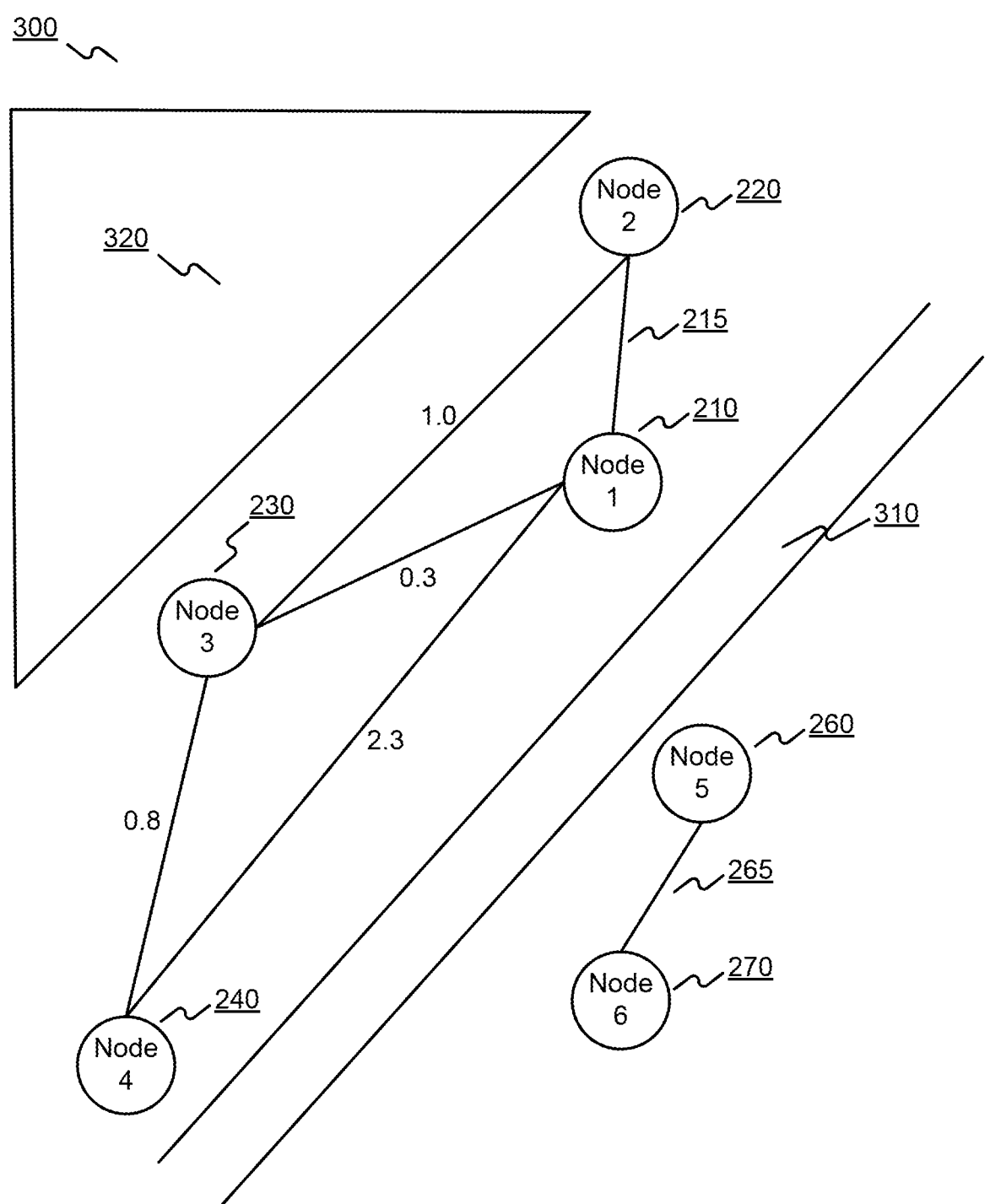

With reference to FIG. 3, in some embodiments, system 100 may perform neighborhood appraisal using the aforementioned graph structure. For example, nodes 1-4 (210, 220, 230, 240) may be considered waterfront properties due to their proximity to a water body 320. Nodes 1-4 (210, 220, 230, 240) may also be considered geographically adjacent to nodes 5-6 (260, 270). Nevertheless, nodes 1-4 (210, 220, 230, 240) may in fact be separated from nodes 5-6 (260, 270) by street 310, meaning that nodes 5-6 (260, 270) are not actually waterfront properties. Looking from a Euclidean distance perspective, conventional systems may assess that node 3 (230) has similar value to nodes 5 and 6 (260, 270) based on their proximity, because conventional systems may find it very difficult to programmatically detect differences in views and other abstract geographical boundaries such as school zones etc. However this assessment would be wrong. In some embodiments of the present disclosure, system 100 may employ graph clustering and network propagation algorithms to programmatically determine the correct neighborhood boundaries.

Figure 4:
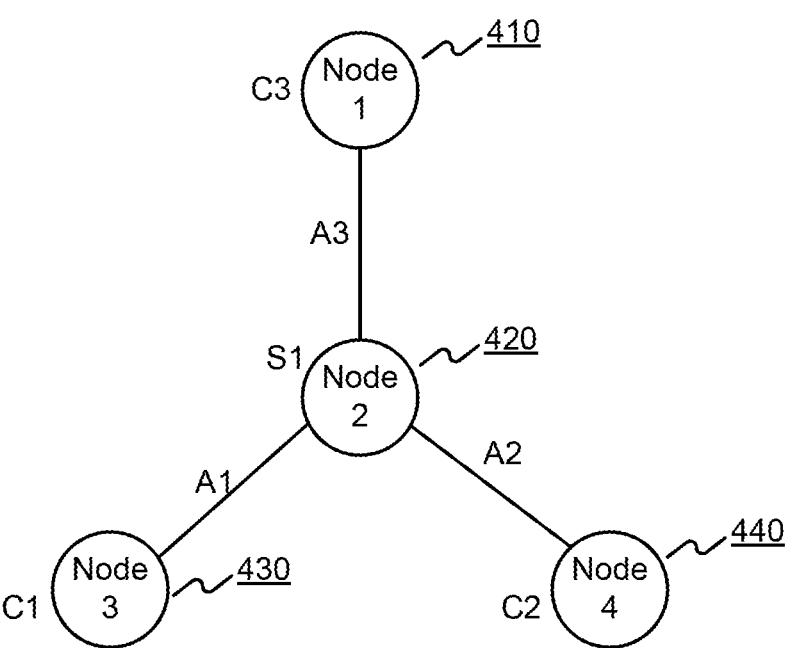
Figure 7:
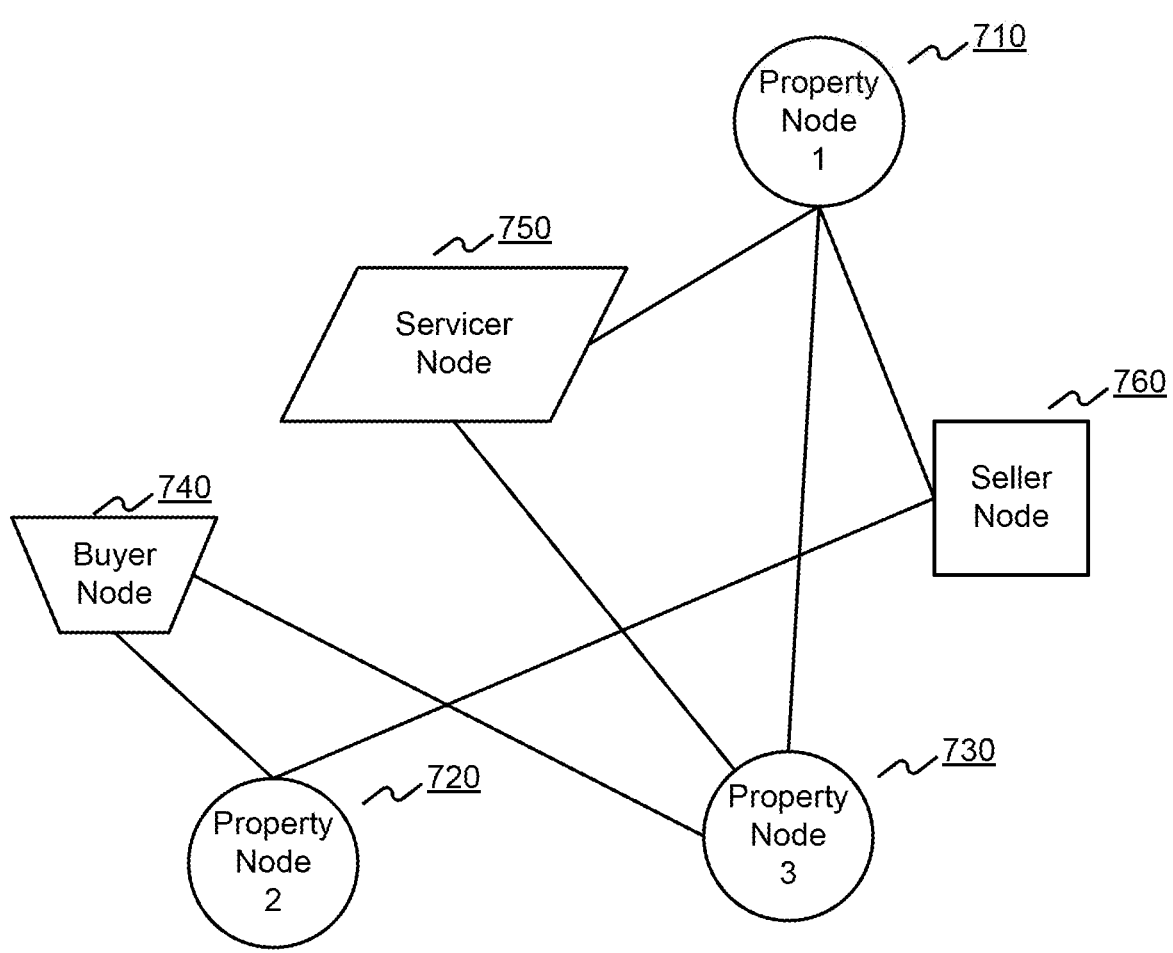

With reference to FIG. 4, in some embodiments, system 100, using the graph structure 200 stored in graph database 150, can develop novel methodologies for estimating the value of a given home. System 100 may use appraisal data to connect homes in the graph structure 200 using the following method. When an appraiser appraises home S1

(node 2, 420), he finds comparable homes C1 (node 3, 430), C2 (node 4, 440) and C3 (node 1, 410) that were recently sold. The system 100 may then apply adjustments A1, A2, A3 to the sale price of C1, C2, C3 respectively based on a set of conditions to compute a set estimate the value of S1 (node 2, 420):

$$S1_{value} \sim A1 \times C1_{value}, A2 \times C2_{value}, A3 \times C3_{value} \quad (1)$$

This equation may also be rewritten as:

$$S1_{value}/A1 \sim C1_{value}, S1_{value}/A2 \sim C2_{value}, S1_{value}/ \\ A3 \sim C3_{value} \quad (2)$$

The subjects S1 and their comps C1, C2, C3 can be added as nodes in the graph 200, and they may be connected by edges with weights that are the appraiser adjustments A1, A2, and A3, as shown in FIG. 4. Using these nodes and edges, system 100 can estimate a pricing distribution for each Node (home) by propagating the graph. For example, for the comparable home C2, system 100 can compute 3 pricing estimations p1, p2, p3 where:

$$p1 = \frac{S1_{value}}{A2}, p2 = \frac{C2_{value} \times A2}{A2}, p3 = \frac{C1_{value} \times A1}{A2}, \quad (3)$$

All the homes in the graph structure 200 may be connected using, e.g., appraisal data, and thus system 100 can build a pricing distribution for all the homes through the connected nodes and their unique paths to the target node of interest.

With reference to FIGS. 5 and 6, in some embodiments, system 100 may utilize graph traversing algorithms to detect anomalies such as in FIGS. 5 and 6 where the anomaly (node 2, 520) has a much higher value than the enclosing comps (nodes 1, 3, 4; 510, 530, and 540) for a subject appraisal (node 2, 520), or anomalous comps (node 2, 620, and node 3, 630) to a subject appraisal (node 1, 610) have no edges with them for N degrees of separation, where can be pre-determined by system 100 or a user 110. System 100 can also estimate the accuracy of an appraisal value by looking at where the appraisal value ranks in the Home Knowledge Graph Pricing Distribution computed for the property as described previously. The appraisals that fall in the tail end (under-valuation) or head (over-valuation) can be targeted for examination.

In general, it is to be understood that the computations using the graph data structure may be executed using big-data processing systems capable of performing parallel-processing of large-scale databases. Such processing systems may include distributed task processing systems that distribute processing across multiple cores of a computer, or across multiple computers. Examples of suitable big-data processing systems may include, for example, parallel computing clusters frameworks such as Hadoop, Apache™ Spark, or Hydra High Performance Computing (HPC). The results can then also be stored on the graph database 150 along with other information that users 110 can then query. For instance, all properties and their associated buyers, sellers, service providers, etc., can be loaded into graph database 150 so that users 110 can easily perform queries, such as who the buyer of a property is, what other homes did that buyer buy, and/or the like. Users 110 may utilize graph structure 200 that is saved on graph database 150 to perform complicated traversal algorithms (such as a home price estimation algorithm by linking homes together with appraisal data). Graph structure 200 may be mirrored, for example, onto a Hadoop Computer Cluster, and system 100 may use the power of parallel computing to perform the graph traversal algorithm and estimate the value of each property stored in graph database 150. Thus, graph database 150 may store the graph structure 200 with all of the different types of nodes and edges that users 110 can query, while any complex backend computation can be done by mirroring graph structure 200 onto, for example, a Hadoop computer cluster for computation. Graph database 150 may be enabled with functionality to connect with such computer clusters, for example running Hadoop.

Figure 8:
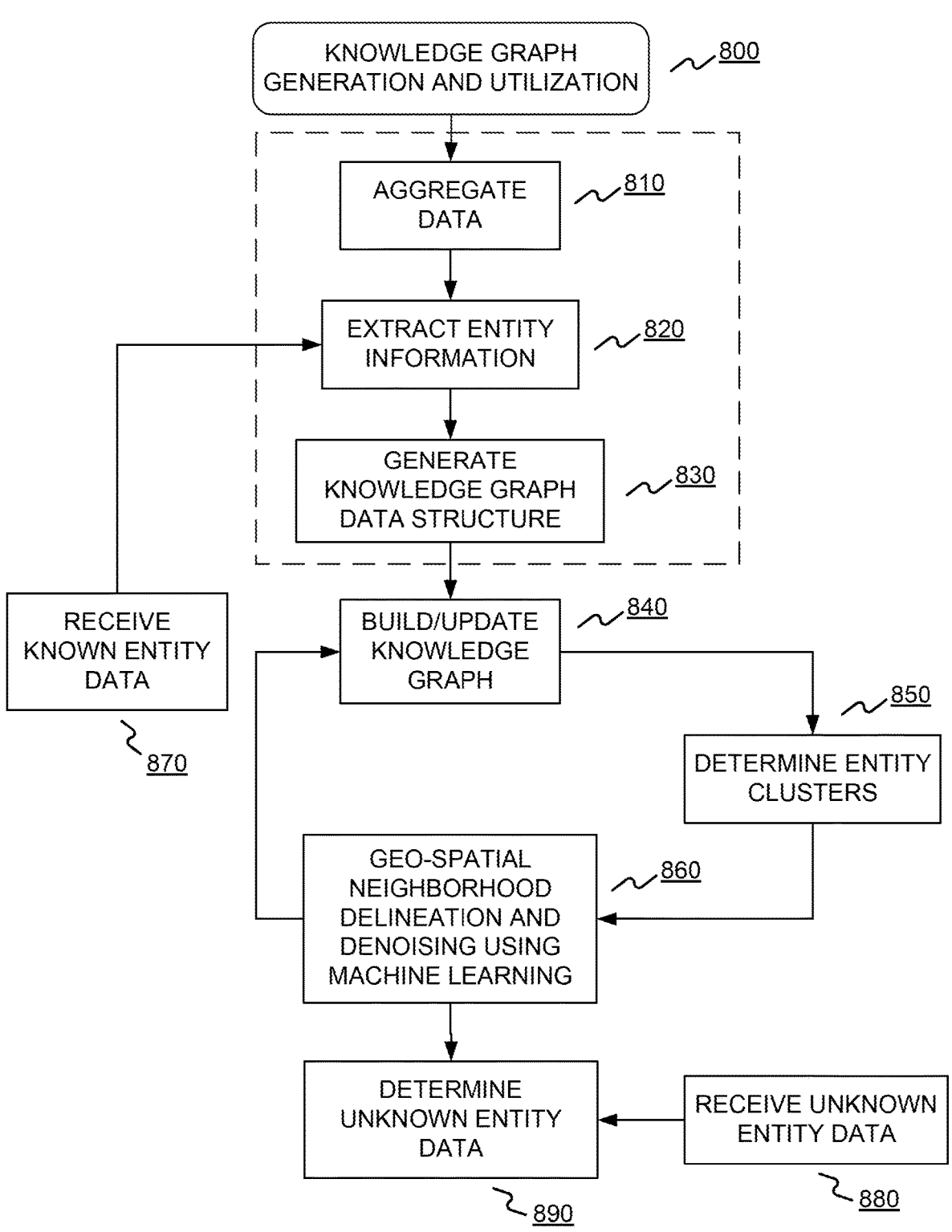
FIG. 8 shows a flowchart of an exemplary knowledge graph generation and utilization process, consistent with disclosed embodiments.

FIG. 8 shows a flowchart of an exemplary knowledge graph generation and utilization process 800, consistent with disclosed embodiments. In some embodiments, process 800 may be performed by a single computer system, such as a multicore processing system or a single cloud-based distributed computing service. In some embodiments, process 800 or portions thereof may be performed by a distributed computing system comprising multiple processing units associated with different server or cloud computing services. Those skilled in the art will appreciate that disclosed processes involve big data-scale data processing, and are suitable for implementation on computing systems capable of orchestrated parallel processing and/or simultaneous multi-threading. For discussion purposes, process 800 is discussed below as being implemented by graph server 140 (hereinafter "server 140").

Process 800 may comprise multiple stages including a first stage of aggregating data and building a knowledge graph, a second stage of utilizing the knowledge graph in one or more scenarios described herein, and a third stage of improving the knowledge graph through continuous data aggregation, knowledge graph updates, and machine learning-based "noise" reduction, all of which are discussed in further detail below.

In step 810, server 140 may aggregate data from one or more networked sources. The one or more networked sources may include one or more databases accessible via network 130, such as third party databases 160. In some embodiments, server 140 may query one or more local memories or databases such as graph databases 150. Server 140 may generate and send one or more query requests for data associated with desired nodes and edges for the knowledge graph, such as home appraisal data, home sale data, information about sellers, buyers, lenders, brokers, and any other entities to be included in the knowledge graph.

In step 820, server 140 may extract entity information from the aggregated data. Step 820 may involve organizing, tagging, and/or searching the aggregated data for identifying and extracting the entity information. Step 820 is discussed in more detail with respect to FIG. 9.

In step 830, server 140 may generate a knowledge graph data structure having the entity information extracted from step 820. As previously discussed, knowledge graph data structures differ from traditional relational databases, and provide the ability to store information representing complex relationships efficiently. Thus, the disclosed embodiments involve creating a new data structure using aggregated home data such as home appraisal data, which is received from traditional relational databases and converted to a format suitable for a knowledge graph database. The generated knowledge graph data structure may be stored in a local memory such as graph DB(s) 150, or stored remotely via network 130.

In step 840, server 140 may build or update a home knowledge graph using the generated data structure. Server 140 may use one or more known knowledge graph bases to generate a knowledge graph using entity and relationship information stored in the knowledge graph data structure.

In step 850, server 140 may determine one or more entity clusters in the knowledge graph. As discussed herein, entity clusters are groups of entities in the knowledge graph that are associated by a threshold level of similarity and/or a threshold proximity to one another in the knowledge graph. Thus, entity clusters may refer to neighborhoods of homes in the knowledge graph. Step 850 is discussed in more detail focusing on the clustering of property nodes to identify neighborhoods with respect to FIG. 10.

In step 860, server 140 may perform machine learning-based classification to perform geo-spatial neighborhood delineation and de-noising. In some embodiments, a machine learner may classify a property's neighborhood membership, given its longitude and latitude. The algorithm may also prune "noisy" or spurious clusters through generalization during classification training. Step 860 is discussed in more detail with respect to FIG. 12. Following step 860, process 800 may return to step 840, in which server 140 may use the machine learning analysis data to update the knowledge graph, such as by changing an identified neighborhood for one or more homes (entities/nodes) in the knowledge graph. In some embodiments, server 800 may also update the knowledge graph data structure based on the machine learning analysis (not shown in FIG. 8).

In step 870, server 140 may receive known entity data for an additional home not included in the knowledge graph. For example, server 140 may receive data for a new appraisal for a home in the knowledge graph, or a new appraisal for a home that is not yet included in the knowledge graph. The entity data may be considered "known" if the appraisal data includes a threshold amount of information describing the value of the home, its attributes, and its comps. Server 140 may receive such data by periodically querying one or more databases, or by receiving automated or scheduled updates in appraisal data, similar to step 810. Server 140 may proceed to extract entity information (step 820), and generate an updated knowledge graph data structure (step 830) and updated knowledge graph (step 840).

In step 880, server 140 may receive unknown entity data, which may include home appraisal data that is below a predetermined threshold amount of information about the home, its value, and/or its comps. For example, if a predetermined threshold rule of 3 comps is set, then server 140 may deem any home appraisal data having only 2 comps to be "unknown" entity data.

In step 890, server 140 may generate and execute one or more queries to traverse the home knowledge graph, to determine unknown entity data. For example, if the received appraisal data includes a number of comps below a threshold level, then server 140 may use the home knowledge graph neighborhood delineation machine learning classifier and the corresponding Hierarchical Cluster Tree Structure to provide the unknown entity with corresponding comps from the Home Knowledge Graph data structure that belong in the same neighborhood.

Figure 9:
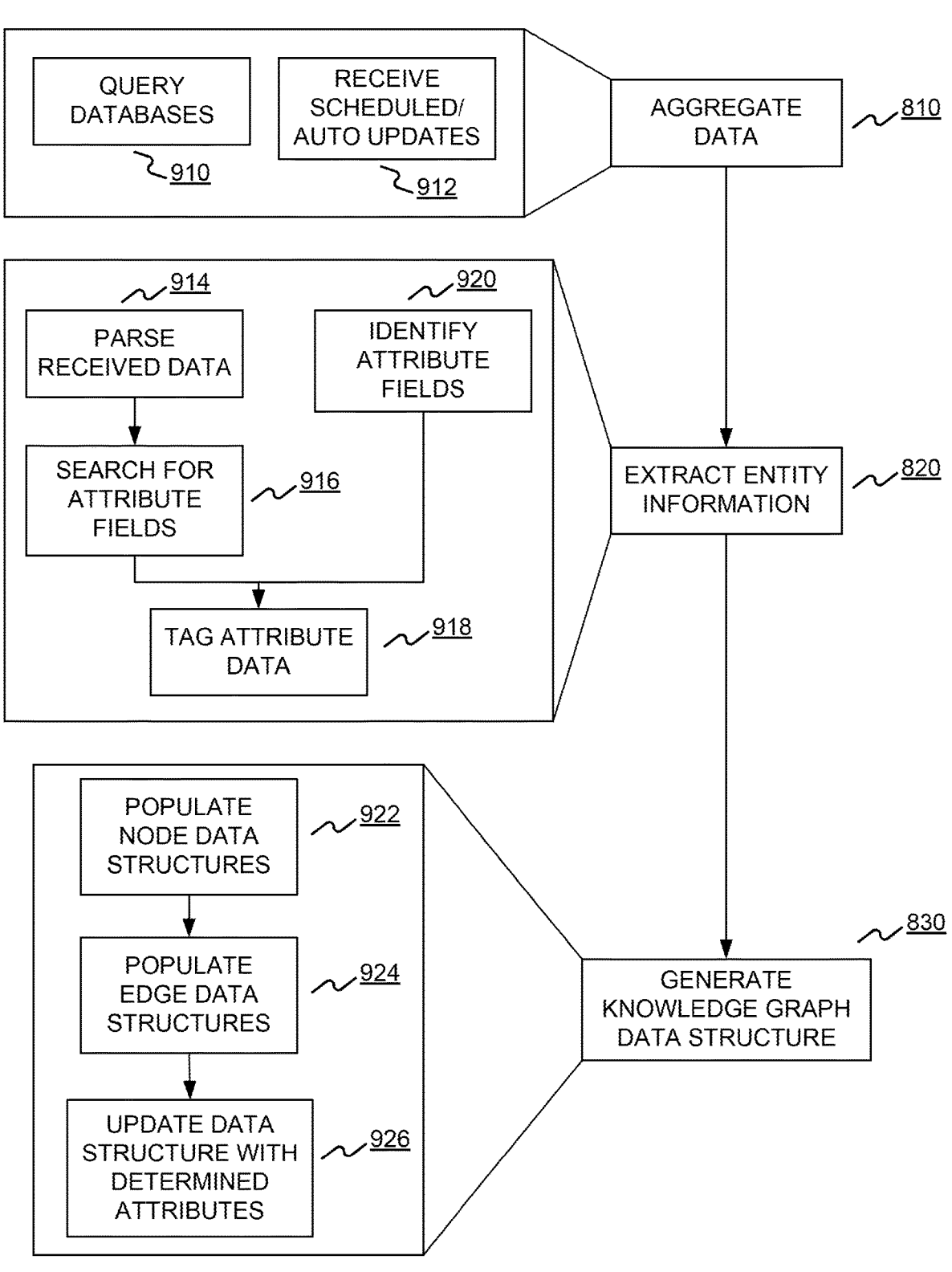
FIG. 9 shows a flowchart of an exemplary data aggregation, entity information extraction, and knowledge graph data structure generation subroutine, consistent with disclosed embodiments.

FIG. 9 shows a flowchart of exemplary subroutine for aggregating data (step 810), extracting entity information (step 820), and generating knowledge graph data structures (step 830), consistent with disclosed embodiments.

In some embodiments, data aggregation step 810 may comprise querying databases 910 and/or receiving scheduled or automatic updates 912. As previously discussed, server 140 may generate and send one or more query requests for entity data such as appraisal data to one or more connected databases (step 910), if server 140 is configured to "pull" entity data. In some embodiments, server 140 may be configured to receive "push" updates from associated databases, and may receive scheduled or automated updates of appraisal data.

In some embodiments, entity information extraction step 820 may comprise a subroutine including some or all of steps 914-920. Received appraisal data may be structured or unstructured. Structured data may identify one or more fields in the data, and the associated values for each given field. Unstructured data may take the form of a string of parameters and values that have little or no identifiable fields.

Steps 914 and 916 may address entity information extraction for unstructured data. In step 914, server 140 may parse the received data using a static or dynamic n-gram parsing scheme, or by detecting spaces or characters in the data that separate values in the data. In step 916, server 140 may search the parsed data for attribute fields. In some embodiments, the parsed data may identify attribute fields, such as by including one or more labels next to the associated values in the appraisal data. In other embodiments, server 140 may search the parsed data for predetermined value formats or ranges of values, and categorize values with predetermined attribute fields. For example, server 140 may employ one or more rules for identifying address information in parsed data, by searching the parsed data for a predetermined format of [house number] [street name] [road label (st./rd./ln./pl./ave., etc.)].

In step 918, server 140 may tag attribute data with identified attribute fields, to create structured data from the unstructured received appraisal data. In some embodiments, appraisal data may be tagged using metadata tags. In some embodiments, server 140 may create a temporary relational table entry having the tagged data.

In some situations, server 140 may receive structured appraisal data, in which the values are already associated with identified attribute fields. For example, server 140 may receive appraisal data that is structured in a relational table. In step 920, server 140 may identify the attribute fields in the structured data. Server 140 may normalize the attribute fields by converting an uncommon attribute field to a predefined attribute field (not shown in figure). For example, server 140 may employ one or more rule sets or lookup tables for identifying a normalized attribute field associated with the identified attribute field, to result in appraisal data that is directly comparable to other appraisal data in the knowledge graph data structure. Server 140 may then tag the appraisal data with the appropriate attribute tags (step 918).

In some embodiments, server 140 may generate knowledge graph data structures (step 830) using a subroutine including some or all of steps 922-926. In step 922, server 140 may populate node data structures in a knowledge graph base by inserting tagged data into appropriate fields in the graph base. For example, server 140 may store known entity information in home appraisal data by storing the attribute fields and associated values in a knowledge graph data structure.

In step 924, server 140 may populate edge data structures in the knowledge graph base, by inserting tagged or determined data into appropriate fields in the graph base. In some embodiments, edge data structures may include information such as edge weights between any two given nodes, such as a home and a comp. In some embodiments, edge weights may be extracted from the appraisal data, and in some embodiments edge weights may be calculated based on information in the appraisal data.

In step 926, server 140 may update the data structure with determined attributes. In some embodiments, determined attributes may include information about an entity that is determined using the knowledge graph, as opposed to data received with the aggregated appraisal data. Such information may include, for example, additional comps that were not included in the original appraisal data, new determined relationships to other homes, data about the home exterior or property data received from one or more geospatial map databases, and additional attributes input by one or more users. After populating and updating the knowledge graph data structures for all known entities, server 140 may proceed to generate or update the home knowledge graph (step 840 of FIG. 8).

FIG. 10A shows a flowchart of an exemplary subroutine for determining entity clusters (step 850 of FIG. 8), consistent with disclosed embodiments. In some embodiments, some steps of FIG. 10A may be performed during step 840 of process 800.

FIG. 10A details an example of how the disclosed embodiments process appraisal data using knowledge graph technology in a manner not previously implemented in property valuation industries, to define accurate neighborhoods having strong comparable homes. Determining more accurate neighborhood boundaries and areas may improve upon current home valuation systems, by providing information about average home values in a given region that is more accurate than traditional zip code or county-based systems. The use of knowledge graph data structures disclosed herein may enable the determination of complex relationships between homes necessary for generating and utilizing the home knowledge graph.

In step 1010, server 140 may extract a node data structure (such as home property data) from the knowledge graph. For example, server 140 may process an entry in the knowledge graph data structure for a particular home, including all appraisal data available for that home. The appraisal data in the data structure may include a plurality of comps, or comparable homes used to create the appraisal.

In step 1012, server 140 may identify subjects, or comparison nodes, stored in data structure for the home, by searching appraisal data stored in the node data structure for identified comps. In step 1014, server 140 may identify attributes for the home and the comps. Server 140 may read the tagged data stored in the knowledge graph data structure to identify the attributes associated with the home and the comps. The attributes may have an associated adjustment value, indicating a home value difference between the home and a given comp, based on a particular attribute. For example, the subject home may have 4 bedrooms, and a first comp in the appraisal data may have 3 bedrooms. The appraisal data may indicate that this attribute is associated with a +$4000 adjustment, because the 4 bedroom home was determined by the appraiser to be worth $4000 more than the 3 bedroom comp home based on the number of bedrooms. As another example, a second comp home having 5 bedrooms may be associated with a-$3000 adjustment, if the appraiser determined that the 4 bedroom home was worth $3000 less than the 5 bedroom comp home, based on the number of bedrooms. In some embodiments, adjustment data may be represented as a multiplier value, rather than a dollar value. In other embodiments, server 140 may calculate a multiplier value by dividing a home value by the comp home value, for one or more attributes, or for the entire home value.

In step 1016, server 140 may calculate comp edge weights for the edges connecting the home and its comps in the knowledge graph. Step 1016 is discussed in further detail below.

In step 1024, server 140 may map the entity nodes in the knowledge graph. Server 140 may read location data in the knowledge graph data structure, such as a street address or latitude/longitude coordinates for the home, and determine spatial relationships between home entities based on geographical location. An example of mapped nodes and edges is shown in FIG. 2.

In step 1026, server 140 may connect entity nodes using edges. Edges may represent a relationship between an entity and its comps as indicated in the appraisal data. The edge may have an associated value that is directly proportional to the degree of similarity between the entity home and a given comp. In some embodiments, the edge value may fall within a predetermined range, such as 1-10 or 0.1-1, where the upper limit may represent the strongest relative similarity between entities in the knowledge graph, and the lower limit may represent the weakest relative similarity between entities in the knowledge graph. In some embodiments, server 140 may normalize all edge values before generating or updating the knowledge graph, to determine normalized edge values that are relative to all other edge values in the knowledge graph.

In step 1028, server 140 may identify or partition nodes into clusters based on the graph topology (e.g., the edge connections in the graph data structure.) For the exemplary use case of neighborhood delineation, step 1028 may implement a hierarchical graph clustering algorithm to learn a hierarchical cluster tree structure that starts at a base level (such as at the county level for this example), and partitions the home nodes into smaller and smaller clusters (neighborhoods) that may be used instead of zip codes for various modeling needs. Neighborhoods learned using this technique may be more uniform compared to computer systems using traditional zip codes, MSA codes etc. Step 1028 is described in more detail with respect to FIG. 10B

Returning to step 1016, in some embodiments, server 140 may calculate comp edge weights by performing one or more of substeps 1018-1020. In step 1018, server 140 may determine attribute adjustments between a home entity and a given comp. The attribute adjustments may be stored in the knowledge graph data structure as being received in the appraisal data, or may be determined by server 140. For example, server 140 may determine an appraisal adjustment value by dividing a home price adjustment associated with the comp and attribute by the home value, to determine a multiplier value corresponding to the adjustment. In some embodiments, server 140 may utilize only the net adjustment between a home and comp, representing the total value adjustment in the appraisal. In other embodiments, server 140 may utilize individual adjustments corresponding to different attributes, and groups of adjustments defined in one or more rule sets of knowledge graph queries.

In step 1020, server 140 may score the determined adjustments. In some embodiments, server 140 may apply a weight to certain attribute adjustments, to normalize the adjustments or to prioritize certain attribute adjustments over others. For example, an attribute adjustment associated with a number of bedrooms may be assigned a higher weight than an attribute adjustment associated with a number of fireplaces. The attribute adjustment weights may be received as part of a knowledge graph traversal query, or predefined and stored in one or more databases. Furthermore, attribute adjustment weights may be adjusted for different geographical locations. Following the example above, a number of bedrooms may be weighted heavily against a number of fireplaces in a warm geographical location, but the two attributes may be assigned the same weighting in a colder region where fireplaces are more desirable. The weighting values may be predetermined and stored, or may be dynamically determined and updated using machine learning techniques.

In step 1022, server 140 may calculate an edge weight/score for a knowledge graph edge connecting a home entity node and a particular comp. The edge weight may comprise a score that is based on a net adjustment value for a given comp in the stored appraisal data. In some embodiments, the edge weight may be determined based on a combination of weighted attribute adjustments, or a weighted/normalized net adjustment.

Figure 10B:
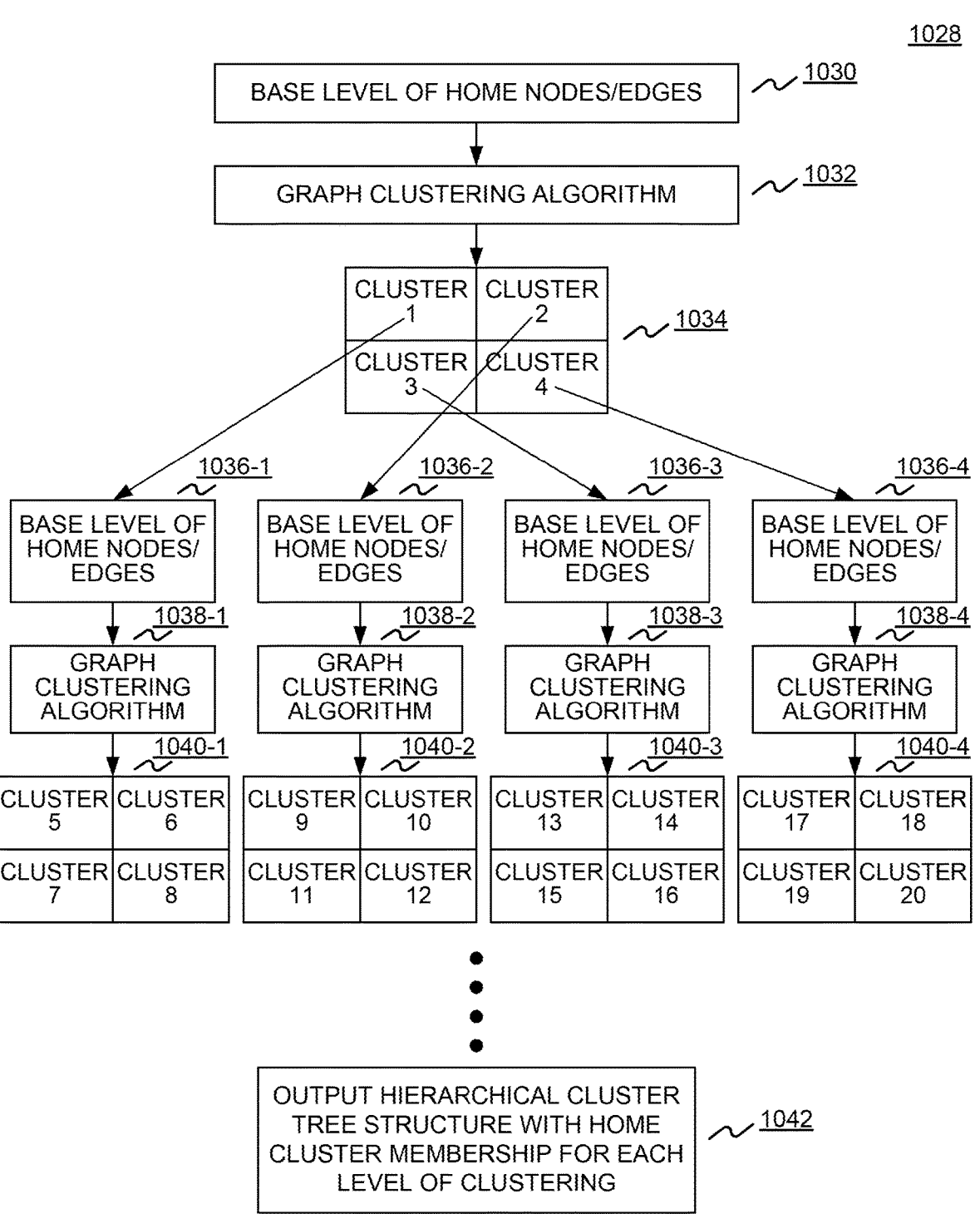
FIG. 10B shows a flowchart of an exemplary subroutine for generating a hierarchical cluster tree structure, consistent with disclosed embodiments.

FIG. 10B shows a flowchart of an exemplary subroutine for generating a hierarchical cluster tree structure, consistent with disclosed embodiments. The subroutine may correspond to step 1028 of FIG. 10A.

In step 1030, server 140 may determine a base level of home nodes and edges between homes.

In step 1032, server 140 may employ a graph clustering algorithm to identify home node clusters corresponding to the base level. Examples of substeps associated with step 1032 are discussed below with respect to FIG. 10C.

In step 1034, server 140 may identify a plurality of clusters associated with the base level, based on the graph clustering algorithm. In the example shown, clusters 1-4 are identified at step 1034. Thus, server 140 may identify four clusters of similar homes located within a certain geographical area such as a county. Server 140 may store an identification of each cluster for the first level of clusters (not shown in figure).

In step 1036, server 140 may identify a base level of home nodes and edges for each of clusters 1-4, shown as steps 1036-1 to 1036-4. Step 1036 may be similar to step 1030.

In step 1038, server 140 may execute the graph clustering algorithm for each of clusters 1-4, shown in FIG. 10B as 1038-1 to 1038-4. In some embodiments, server 140 may use the same graph clustering algorithm as step 1032. In other embodiments, server 140 may employ a graph clustering algorithm that is modified for the particular level of detail, such as a modified algorithm that requires greater similarity between homes to identify clusters, as opposed to the graph clustering algorithm employed in step 1032. In the example shown, clusters 1-4 are each divided into four subclusters, representing smaller clusters (neighborhoods) with increased levels of similarity within the county.

Server 140 may continue executing the graph clustering algorithm to identify additional cluster levels (not shown in figure). Once complete, in step 1042 server 140 may output a data structure having the hierarchical cluster tree structure, with home cluster membership identification labels for each level of clustering. Cluster membership identification labels may be stored in the data structure for each home node. Alternatively, in some embodiments the graph data structure may include a data structure for each cluster at least level of the tree, each data structure identifying the member nodes.

FIG. 10C shows a flowchart of an exemplary subroutine for a graph clustering algorithm, consistent with disclosed embodiments.

In step 1044, server 140 may assign a unique label to each node and its cluster membership.

In step 1046, server 140 may propagate the unique label for each node. The propagated information may include the node label vector multiplied by its edge weight to connected comp nodes.

In step 1048, server 140 may aggregate, for each node, all of the label vectors propagated by the connected comp nodes.

In step 1050, server 140 may normalize the label vector to a unit magnitude, for each of the nodes.

In step 1052, server 140 may assign a cluster membership of each node as the largest label in its label vector.

In step 1054, server 140 may compute an amount of nodes that have changed cluster membership, such as a percentage of nodes that changed from a first membership to a second membership.

In step 1056, server 140 may determine whether a predetermined threshold of node changes is surpassed. For example, server 140 may determine whether the computed percentage of changed nodes is beneath a predetermined threshold. If the percentage change is beneath the threshold ("Yes" in step 1056, then in step 1058 server 140 may output the cluster memberships, and add the memberships to the hierarchical cluster tree structure. If the percentage of changed clusters exceeds the predetermined threshold ("No" in step 1056), then subroutine 1032 may return to step 1046.

Figure 11A:
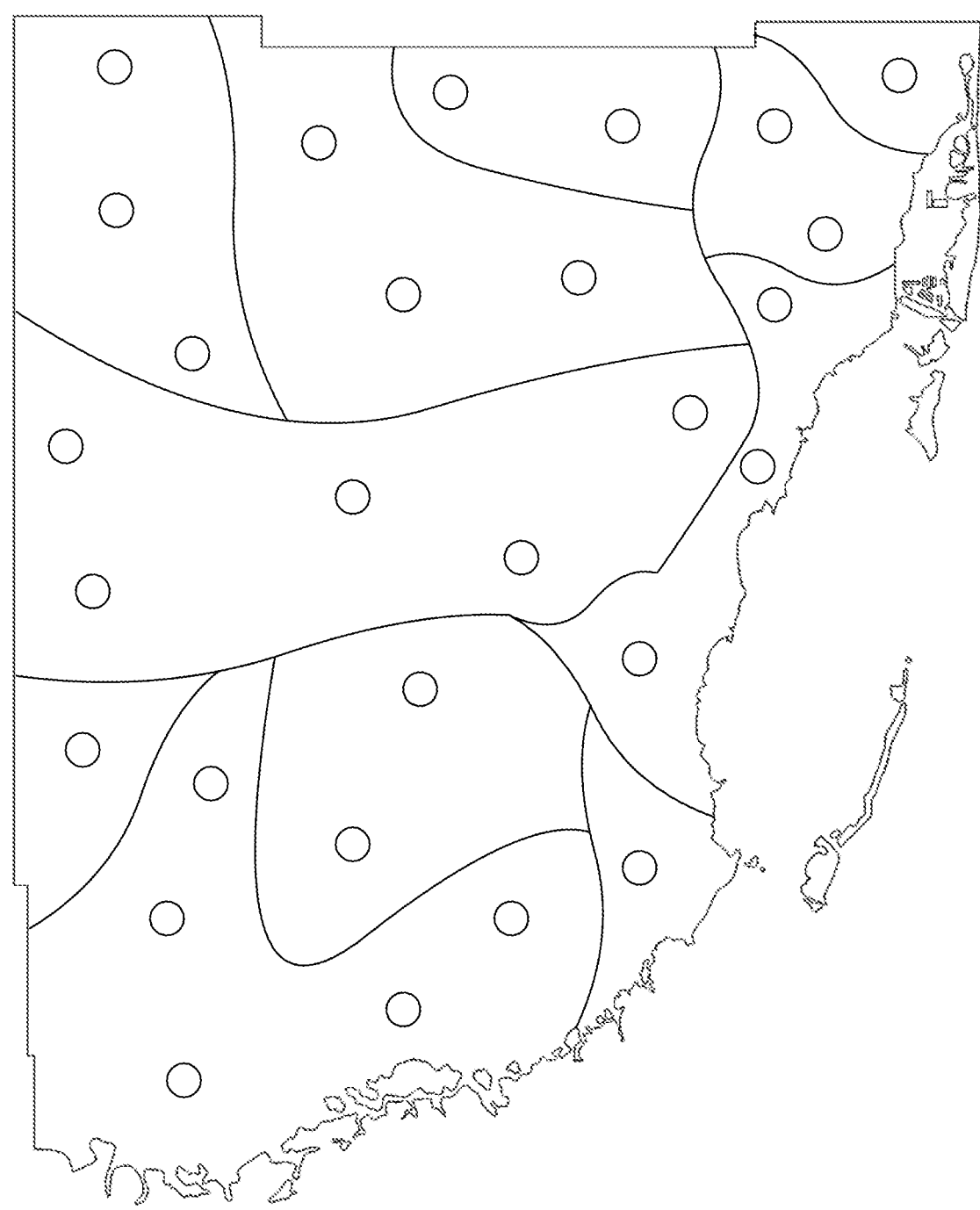
FIGS. 11A-11D illustrate exemplary cluster diagrams, consistent with disclosed embodiments.

FIGS. 11A-11D illustrate exemplary cluster diagrams, consistent with disclosed embodiments. FIG. 11A shows an example of a first cluster diagram generated using a home knowledge graph consistent with disclosed embodiments. Different colored regions may identify different clusters in the geographical region. As shown, the diagram includes more than a dozen different clusters, representing different neighborhoods of similar homes having comparable values. Using traditional systems that apply average home values for a zip code or defined subdivision, the same diagram may include only 1-4 different clusters, due to the few subdivisions within the county. However, conventional systems would produce very inaccurate home values, because the same county may include different population densities ranging from high-density urban areas to low-density rural areas. Furthermore, conventional systems are not capable of performing the clustering processes disclosed herein, because traditional systems are based upon relational databases such as basic matrices and lookup tables that are incapable of storing data for complex relationships between entities, and in formats that can be processed efficiently at the scale required for analyzing even relatively small geographic regions. Furthermore, traditional clustering algorithms rely on descriptive features such as number of bedrooms, bathrooms etc. There are many subjective features, such as the feel of the neighborhood, etc., that cannot be described using traditional home data, and traditional clustering algorithms are extremely sensitive to the features value range. To provide more accurate results than traditional systems, disclosed embodiments store data regarding subjective aspects from all the past appraisers for a given property in a graph data structure, and use graph clustering algorithms to identify neighborhoods that cannot be determined using traditional computer systems and techniques.

Figure 11B:
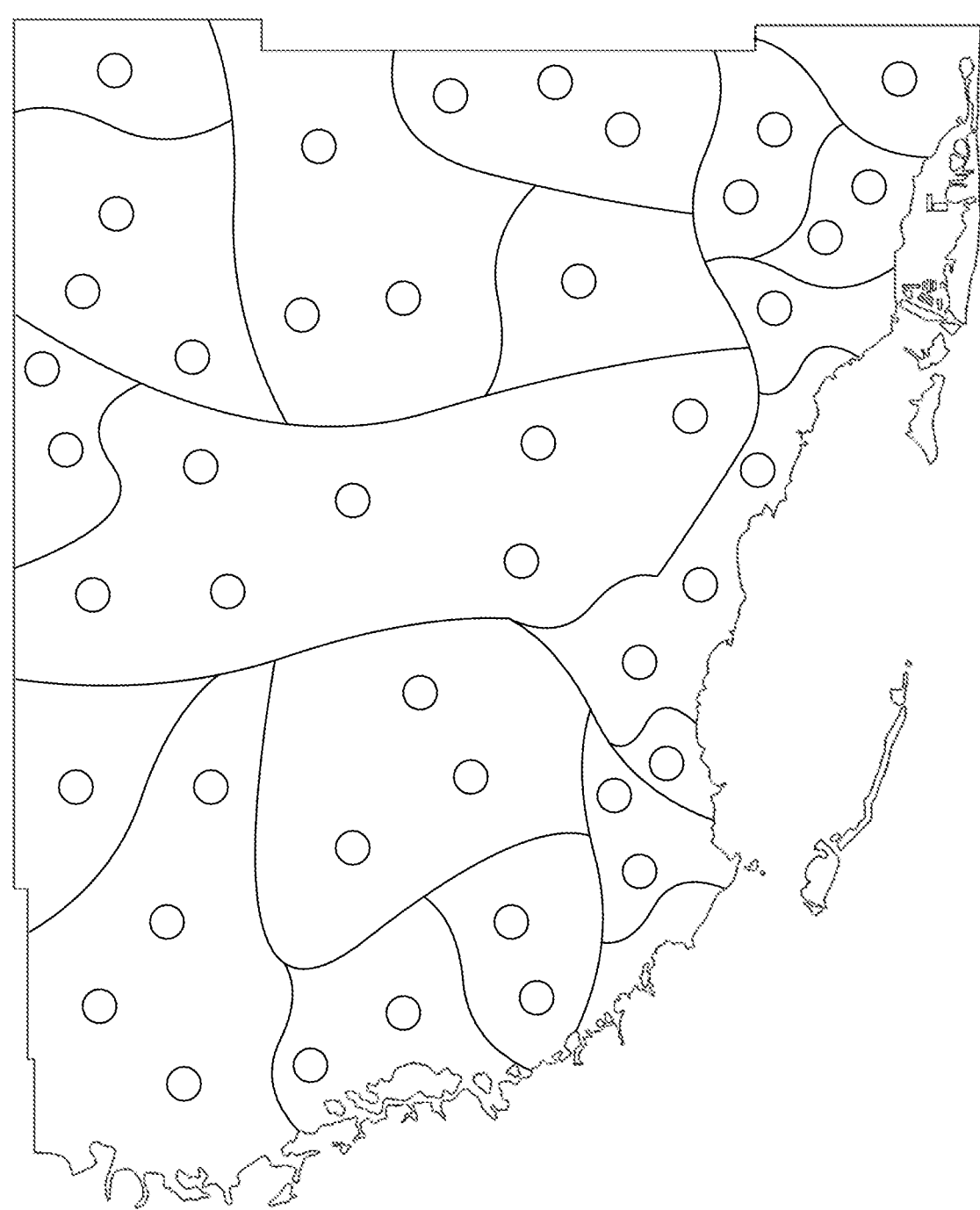

FIG. 11B is an example of a second cluster level generated by the Hierarchical clustering algorithm of the disclosed embodiments, demonstrating an iterative level of clustering resulting in smaller clusters/neighborhoods of greater similarity. In the example shown, server 140 may employ more stringent optimization criterion during clustering within each individual cluster from the previous clustering level. As shown, clusters that were larger in FIG.

11A are now divided into smaller subclusters, representing smaller groups of homes that are more closely related.

Figure 11C:
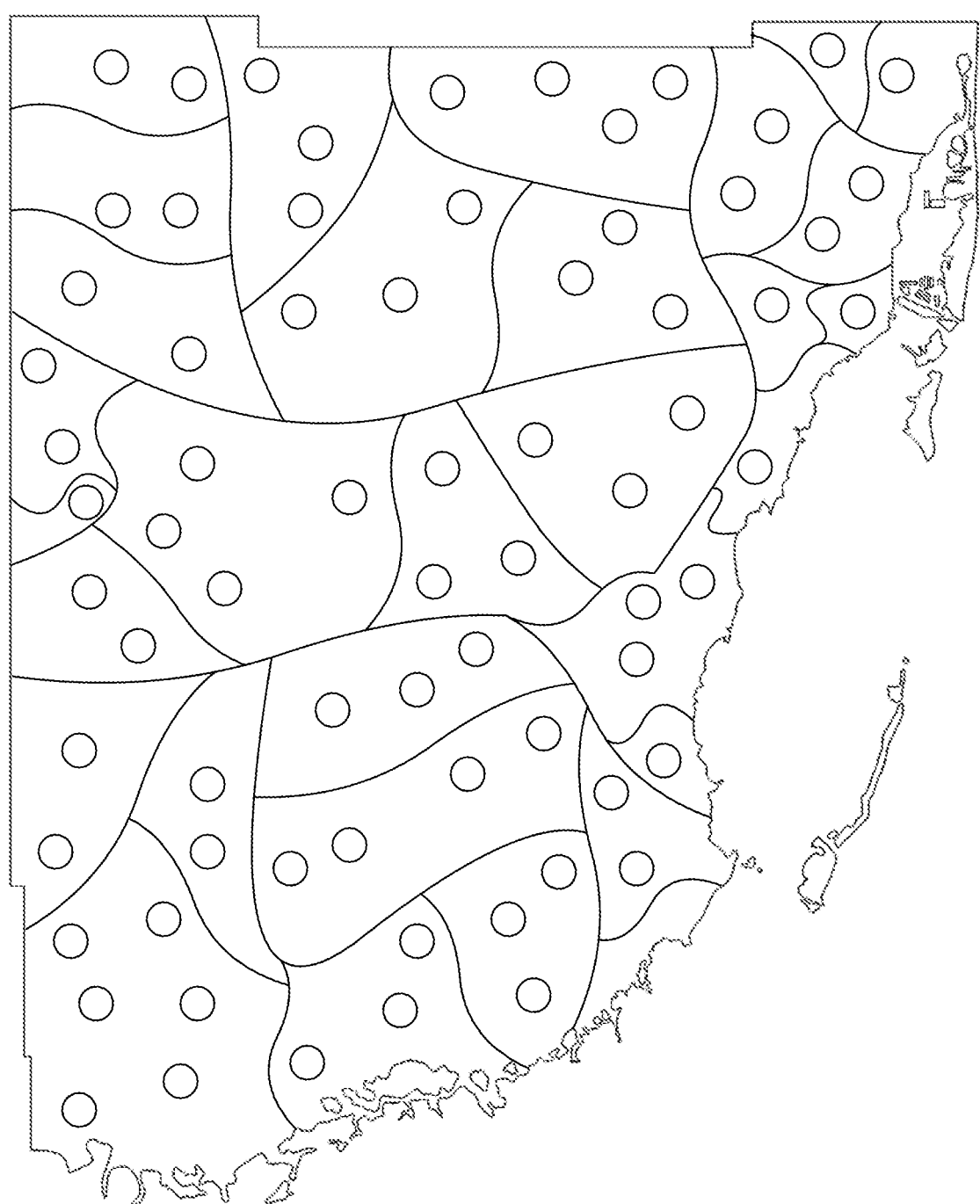
Figure 11D:
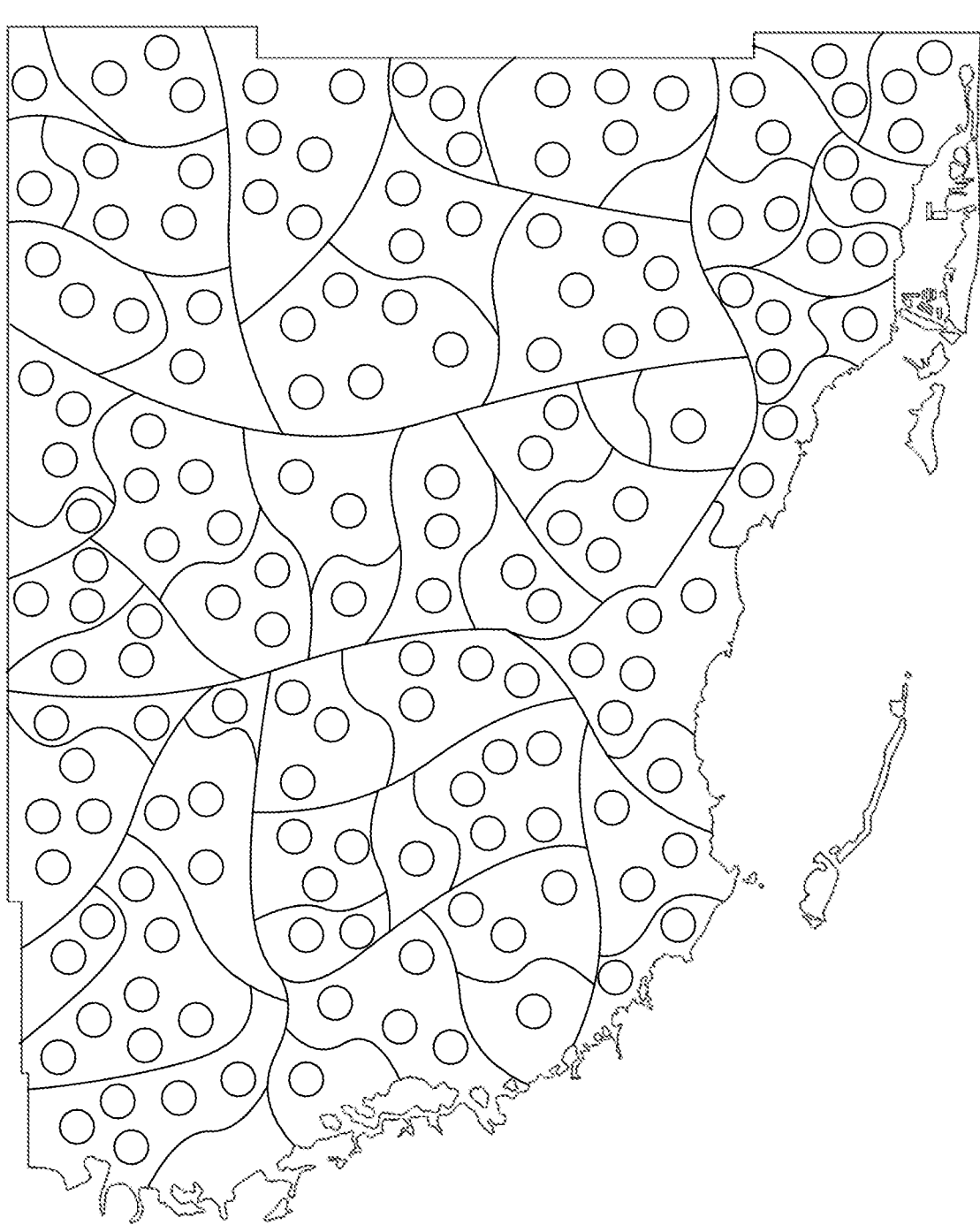

FIGS. 11C and 11D demonstrates additional Hierarchical levels of clustering resulting in increasingly finer cluster/neighborhoods. Using the disclosed embodiments, neighborhoods may be accurately defined using graph clustering (network detection) analyses of home appraisal data stored in a knowledge graph data structure, rather than arbitrary regional boundaries and subdivisions that may not accurately represent areas of comparable home values.

The boundaries of defined clusters and subclusters may be learned and stored in a database and imported for use in a home value estimation system, in place of traditional boundaries defined by zip code and political boundaries. For example, home value estimation computer systems may estimate a target home value by determining the average home value of a cluster where the target home is located. In contrast, traditional systems utilize the average home values of a zip code or subdivision, which can be arbitrary and have average home values that misrepresent the localized area of the target home. Thus, the disclosed embodiments generate new data that may be used to improve the efficiency and accuracy of other computer systems used in home valuation technologies.

FIG. 12 shows a flowchart of an exemplary subroutine for geo-spatial neighborhood delineation and denoising using machine learning (corresponding to step 860 of FIG. 8). In some embodiments, a machine learner may be trained for determining a property's neighborhood based on its location (longitude, latitude). In some embodiments, the machine learning algorithm may learn the boundaries that define each neighborhood using techniques disclosed herein. Step 860 also has an added benefit of removing noisy/spurious neighborhoods through generalization during training of the machine learning algorithm.

In step 1210, server 140 may output a hierarchical cluster tree structure with home cluster memberships (e.g. neighborhoods) identified for each level of clustering. Step 1210 may correspond to step 1042 of FIG. 10B.

In step 1212, server 140 may extract all leaf nodes from the hierarchical cluster tree structure.

In step 1214, server 140 may extract longitude and latitude data of each property node, and assign the leaf node cluster ID belonging to each node, to identify a class label for each node.

In step 1216, server 140 may input longitude, latitude, and class label data for each of the nodes into a machine learning algorithm employed by server 140 or a processor in communication with server 140. For discussion purposes, server 140 is disclosed as executing the machine learning algorithm. In some embodiments, the inputted data may be used to perform classification learning using the machine learning algorithm. Machine learning algorithms may include neural networks or other learner algorithms known to those skilled in the art.

In step 1218, server 140 may iterate through lower level nodes of the hierarchical tree structure, starting from the root node. Server 140 may analyze node data for a given level/class, and determine whether the aggregate classification accuracy of each of the children nodes in the level is below a predefined threshold for the level. If the aggregate accuracy is below the predefined level threshold, then the children nodes may be removed from the level, thereby pruning, smoothing and generalizing the level. If nodes are removed ("Yes" in step 1220), then the process may return to step 1212 for an additional iteration.

If the aggregate accuracy is above the predetermined threshold (step 1218) and no nodes are moved from the level ("No" in step 1220), then the process may proceed to step 1222, in which server 140 outputs a pruned hierarchical cluster tree structure. Server 140 may also output a classifier trained to classify leaf node relationships based on an inputted longitude and latitude, for determining a particular neighborhood for a home based on latitude and longitude data for the home. With the final iteration of the trained Machine Learning neighborhood delineatio model, users can for any given location based on longitude and latitude, determine its neighborhood membership on the finest level of the Hierarchical Clustering Tree Structure. This information can be used to partition a population of properties similarly to traditional usage of zip/county/censutract classification to partition properties. However traditional methods might have highly variable neighborhoods within while the neighborhoods learned with the proposed method would be more uniform in comparison. For majority of applications, sometimes larger neighborhoods are needed while still maintaining uniformity within the neighborhood. This can be done by first identifying the neighborhood membership of a property at the lowest level of the Hierarchical Clustering Tree Structure and then depending on the need of the user, he/she can move the properties up/down the Hierarchical Clustering Tree Datastructure to achieve bigger/smaller neighborhoods while still optimizing for uniformity within the neighborhood boundaries. This can be useful for a variety of modeling/analysis/polling applications.

In some embodiments, the home knowledge graph may enhance current statistical analyses for home valuations, to provide more accurate valuations that are "crowd sourced" based on the database on relationships between home entities. Traditional appraisals that are prepared by appraisers use 1-5 comparable homes (comps), but some selected comps vary significantly from the appraised home. The disclosed embodiments can identify comps that are in fact improper, using knowledge graph traversal techniques. For example server 140 may determine a distribution of home values associated with a particular home entity, by identifying the comps in the appraisal data, as well as relationships between the comps and other comps in different appraisals.

In some embodiments, server 140 can identify relationships between a home and comps to the nth degree of separation. In some embodiments, the value of n may be predetermined and stored in a memory. In other embodiments, the value of n may be determined dynamically based on a rule set associated with the size of the knowledge graph. As an example, server 140 may identify a comp in appraisal data for a home, representing the first-degree comp. The appraisal data for that comp may identify three more comps, representing a second-degree relationship to the original home. Server 140 may repeat this process to identify comps to a particular degree, and then generate a distribution graph of the home's valuation using the identified comps and their home value adjustments as compared to the original home. To determine a net value adjustment (or attribute adjustment) for a comp of the $2^{nd}$ degree to the home, server 140 may multiply the $1^{st}$ degree comp adjustment and the $2^{nd}$ degree comp adjustment, resulting in an edge weight between the home and the $2^{nd}$ degree comp. Server 140 may repeat this process for a plurality of comps to the n-th degree to generate sufficient data for a curve of home valuations. Using the determined curve, server 140 may identify outlying comps that fall outside of a predefined standard deviation, or other statistical outlier.

Figure 13A:
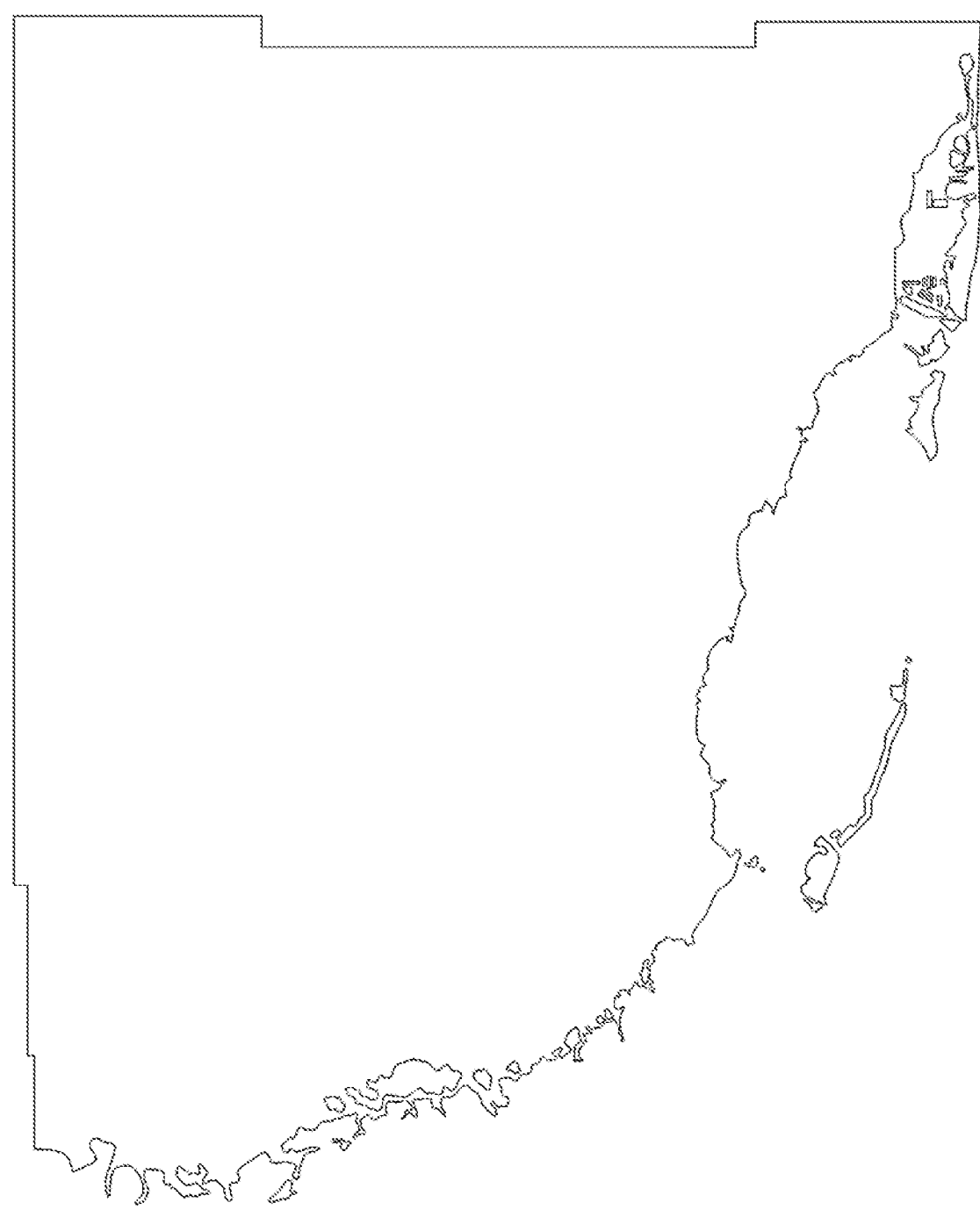
FIG. 13A illustrates an exemplary neighborhood diagram prepared using conventional systems.

FIG. 13A illustrates an exemplary cluster diagram prepared using conventional systems. As shown, the entire county is a single color, as conventional home valuation systems often utilize the average home value for a large region such as county. In the example shown, the county includes areas ranging from dense, waterfront city properties to rural inland regions, and the average home values resulting from such conventional systems would be grossly inadequate for estimating a home value in a particular area of the county.

Figure 13B:
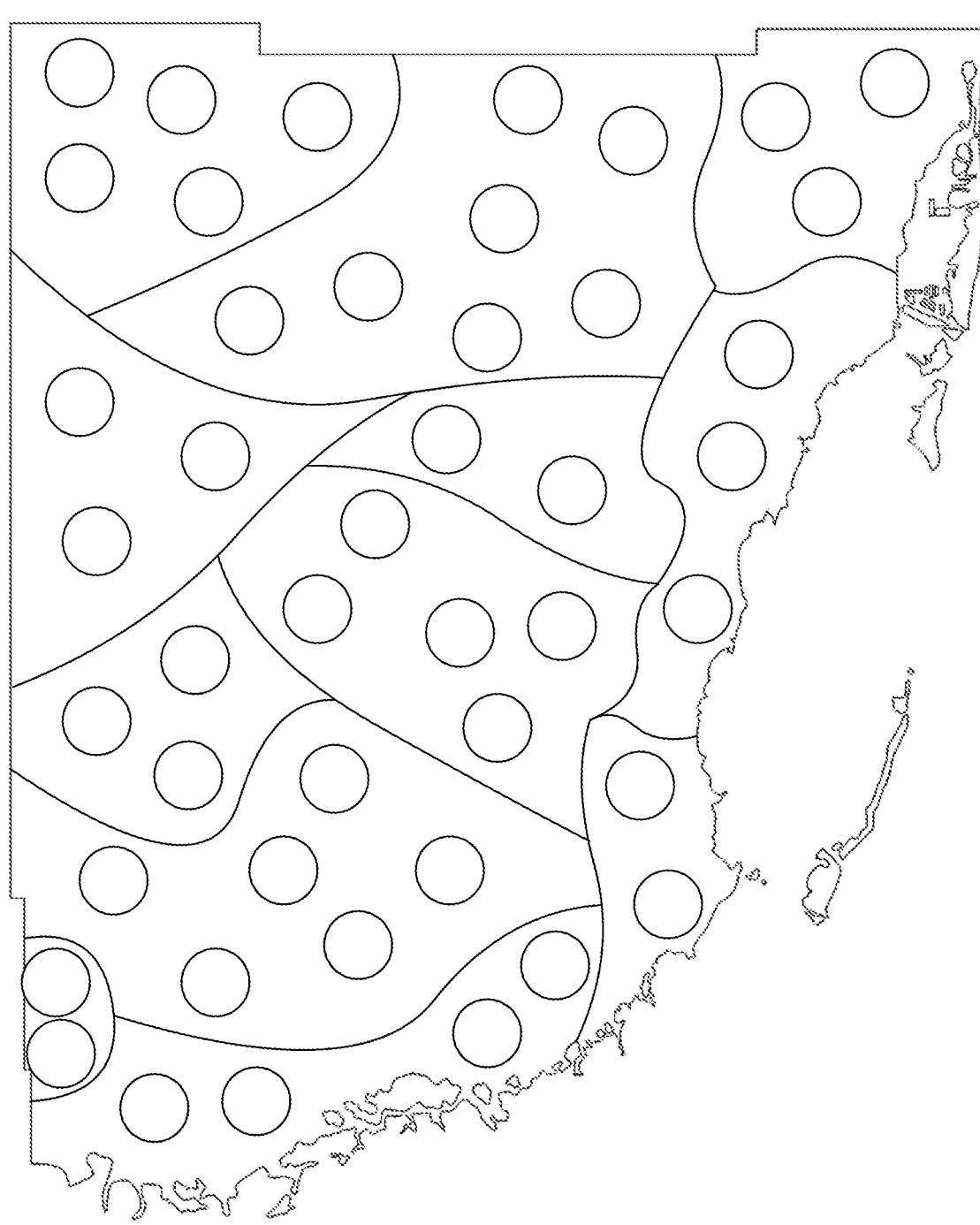
FIGS. 13B-13D illustrate exemplary cluster diagrams processed using machine learning noise reduction techniques consistent with disclosed embodiments.
Figure 13C:
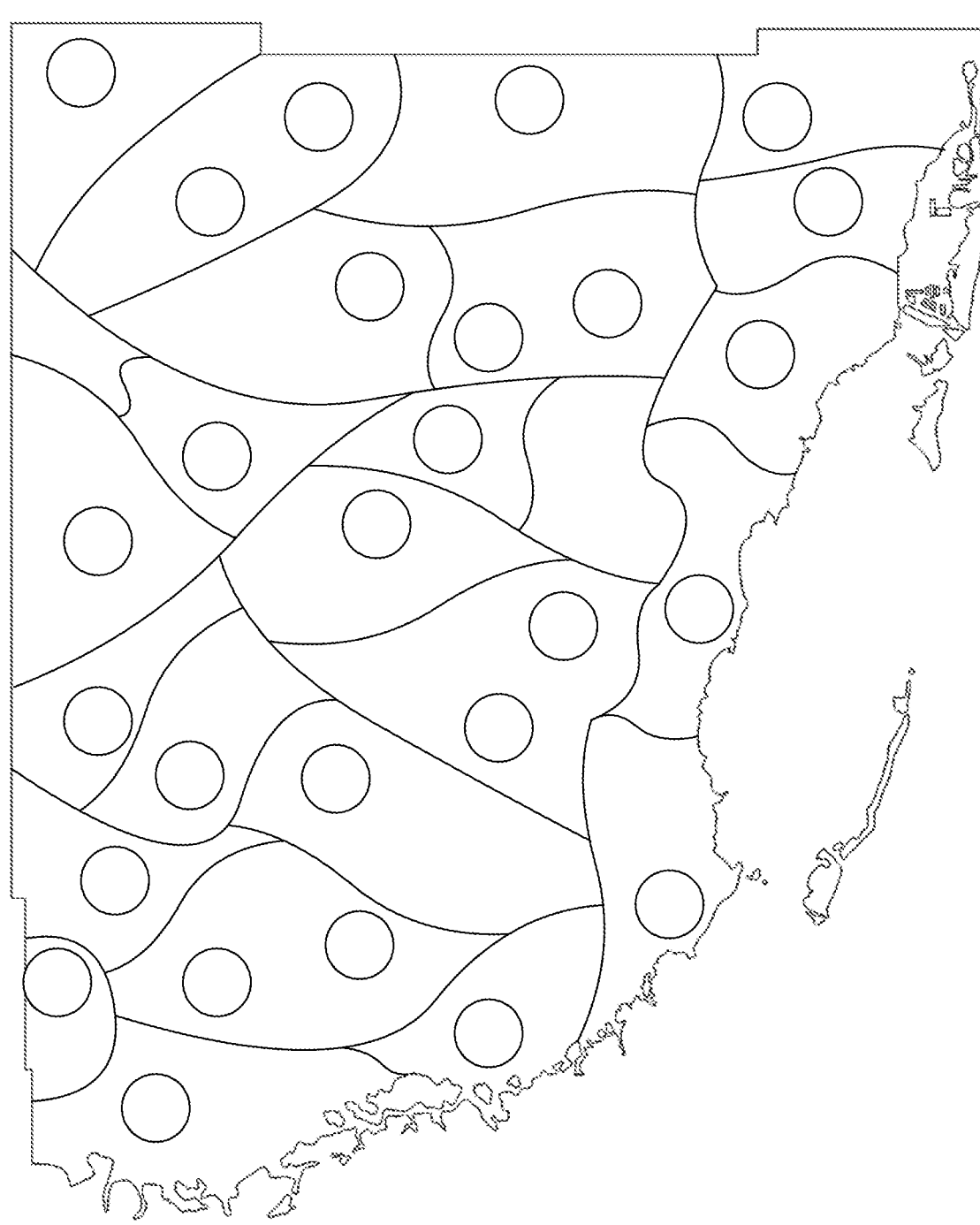
Figure 13D:
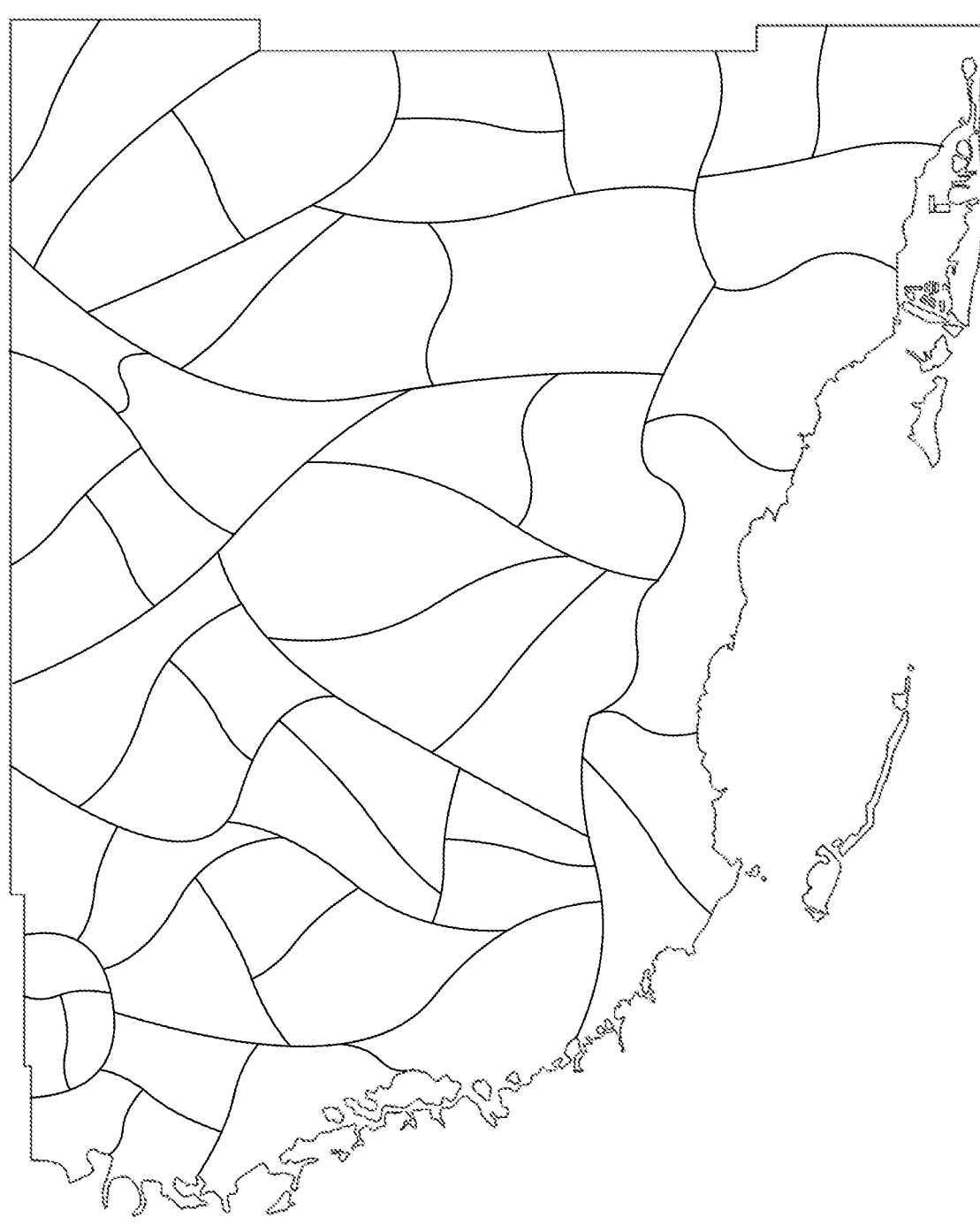

FIGS. 13B-13D illustrate exemplary neighborhood delineation through the training machine learning classifiers that to classify a properties neighborhood given its location and also removes spurious neighborhoods through generalization. As shown, the cluster diagrams may become increasingly cleaner through multiple iterations of machine learning noise reduction. Regions may include clusters having fewer scattered subclusters.

Figure 14:
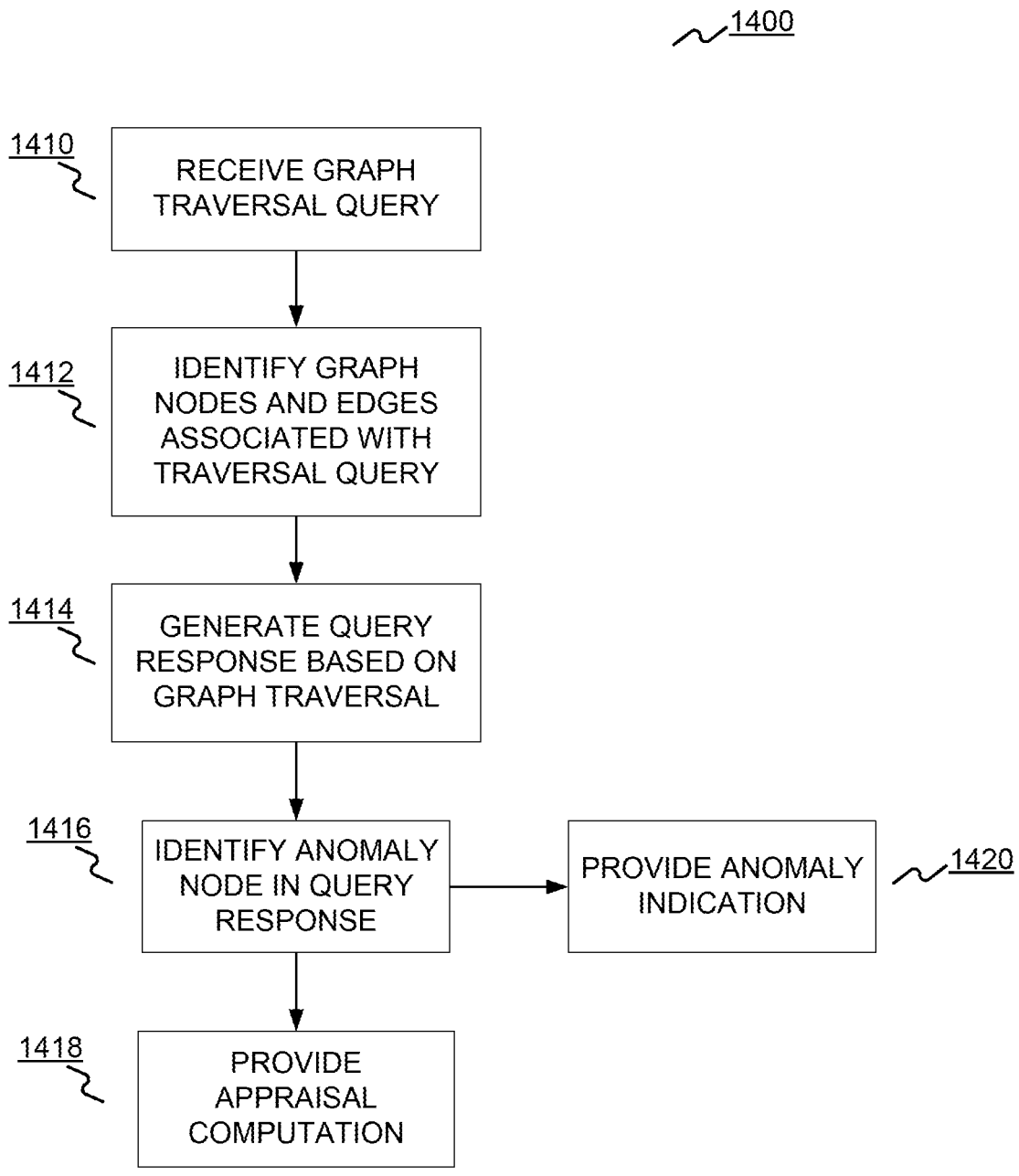
FIG. 14 shows a flowchart of an exemplary knowledge graph traversal process 1400, consistent with disclosed embodiments.

FIG. 14 shows a flowchart of an exemplary knowledge graph traversal process 1400, consistent with disclosed embodiments. In step 1410, server 140 may receive a graph traversal request. In some embodiments, server 140 may receive a request from user device 120 via network 130. In step 1412, server 140 may identify graph nodes and edges associated with traversal query.

In step 1414, server 140 may generate a query response based on graph traversal. In some embodiments, server 140 may traverse the knowledge graph using the identified nodes and edges associated with the traversal request. Server 140 may traverse the graph using one or more techniques discussed above with respect to FIGS. 3-7.

In step 1416, server 140 may identify an anomaly node based on a criterion that is problem-specific, in the query response, consistent with techniques discussed above with respect to FIGS. 5 and 6.

In step 1418, server 140 may provide appraisal computation based on the graph traversal and generated query response. In some embodiments, server 140 may generate data for displaying one or more graphical user interfaces on user device 120. Sever 140 may format the generated data for transmission over network 130.

In step 1420, server 140 may provide an anomaly indication, identifying the anomaly found in step 1416. In some embodiments, server 140 may transmit data to display an indication of the anomaly for display on user device 120.

User device 120 may be include a user interface for displaying a visualization of the knowledge graph and a topology of the graph including nodes and edges. An exemplary interface is discussed below in reference to FIG. 20. User device 120 may also be configured to receive input from one or more users for interacting with graph features. In some embodiments, the visualization may receive user input to navigate of the knowledge graph by enabling expansion/compression of connections, viewing node and edge properties, and running queries/algorithms to automatically update the visualization with results. The user interface may also include query box to receive input, visualization controls for customizing the visualization, an information box for displaying details related to one or more selected nodes, and/or statistics pertaining to the visualization.

In some embodiments, system 100 may use knowledge graph technology in a manner not previously implemented in loan origination or property valuation/transfer industries. Characteristics of the one or more loans may include a loan to value (LTV) ratio, one or more indicators of fraudulent behaviors, and/or suspicious activities. Determining and analyzing one or more loan characteristic using knowledge graphs may improve upon current systems, by providing particularized information about an appraisal source or property LTV that is more accurate and efficient than analyzing loan characteristics with traditional zip code information or county-based systems. The use of knowledge graph data structures disclosed herein may enable the determination of complex relationships between properties, loans, and appraisal values for generating and utilizing the knowledge graph.

Disclosed embodiments may use knowledge graph technology to determine complex relationships between entities associated with loans such as the lender/originator and appraiser for a loan, as well as trends associated with the related parties. For example, disclosed embodiments may detect groups of nodes associated with trends or parameters previously identified as "fraudulent" or "suspicious," which may include certain loan amounts by a particular lender/originator that are consistently associated with inaccurate appraisals values. In certain example, disclosed embodiments may identify trends of parameters and have not previously been confirmed as "fraudulent" or "suspicious" in order to identify previously unidentified schemes. As another example, disclosed embodiments may identify groups of originators and appraisers are found to be working together at a much greater frequency than statistical averages, in combination with a statistically higher number of warning flags and anomalous loan characteristics, which may indicate an emerging pattern of fraudulent activity by the identified group. As yet another example, disclosed embodiments may search one or more databases of affinity values between knowledge graph nodes to link mortgage entities (lenders/originators, appraisers, buyers, sellers, etc.) with identified warning flags and anomalous loan characteristics, whereas such links and relationships may not be feasibly obtainable without the use of knowledge graph technology.

In some embodiments, system 100 may be configured to generate and implement knowledge graphs for detecting one or more patterns and statistical indicators of fraud. For example, server 140 may aggregate data, extract information, and generate knowledge graph data structures pertaining to subject nodes and loan data consistent with disclosed embodiments (steps 810-830 of FIG. 9). Server 140 may aggregate stored data in which values are already associated with identified attribute fields and pertaining to one or more subject nodes or receive subject node data. Subject node data may relate to one or more loan originators and include one or more loans associated with appraised properties. For example, server 140 may receive loan data that is structured in a relational table. The received loan data include attribute information pertaining to a loan originator, a property value determined by an appraisal source, loan amount offered to a borrower, and appraiser source information including an appraiser name, license information, affiliated organization and/or employer. Server 140 may identify attribute fields corresponding to the attribute information in the structured data. Server 140 may tag the appraisal data with the appropriate attribute tags and update the data structure with determined attributes. In some embodiments, determined attributes may include information about an entity that is determined using the knowledge graph, as opposed to data received with the aggregated appraisal data. Such information may include, for example, neighbors of a subject node based on one or more determined relationships, a property value estimate, a risk profile associated with a loan, and additional attributes input by one or more users. After aggregating and receiving the loan data, server 140 may populate and update the knowledge graph data structures for all known subjects. Server 140 may also proceed to generate or update the home knowledge graph.

Returning to FIG. 8, at step 840, server 140 may build or update a knowledge graph using the generated data structure. Server 140 may use one or more known knowledge graph bases to generate a knowledge graph using information pertaining to subject nodes and loan nodes stored in the knowledge graph data structure.

In step 850, server 140 may determine one or more subject clusters in the knowledge graph. As discussed herein, subject clusters may represent groups of subject nodes in the knowledge graph that are associated by a threshold level of similarity and/or a threshold proximity to one another in the knowledge graph. In some embodiments, server 140 may determine subject clusters based in part on levels of geographic proximity between an appraiser and other entities such as a loan originator or property associated with a loan. In such embodiments, different "neighborhoods" may be generated within the knowledge graph by setting the threshold geographic proximity to different values. Thus, subject clusters may refer to neighbor loan originators in the knowledge graph. Step 850 is discussed in more detail focusing on the clustering of subject nodes to analyze loan data with respect to FIG. 15A.

Figure 15A:
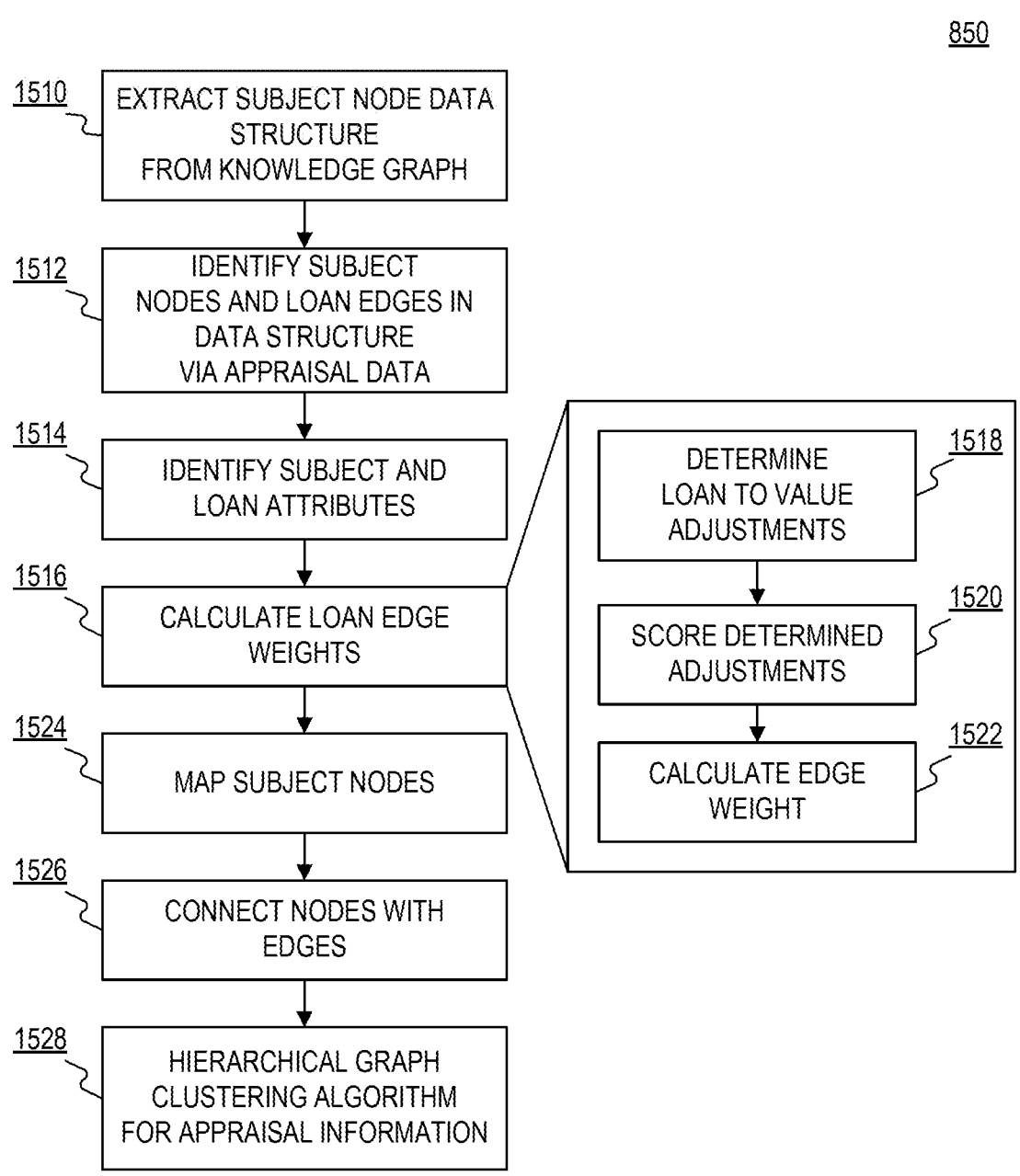
FIG. 15A shows a flowchart of an exemplary subroutine for determining subject node clusters, consistent with disclosed embodiments.

FIG. 15A shows a flowchart of an exemplary subroutine for determining subject node clusters (step 850 of FIG. 8), consistent with disclosed embodiments. In some embodiments, some steps of FIG. 15A may be performed during step 840 of process 800.

FIG. 15A details an example of how the disclosed embodiments process appraisal data using knowledge graph technology. In step 1510, server 140 may extract a subject data structure from the knowledge graph. For example, server 140 may process an entry in the knowledge graph data structure for a particular loan originator, including all appraisal and loan data available for that property. The appraisal data in the data structure may include a plurality of comparable properties used to create the appraisal value of that property.

In step 1512, server 140 may identify subjects, or neighbor nodes, stored in data structure for the property, by searching appraisal data stored in the node data structure for one or more predetermined subject/entity types. For example, server 140 may identify one or more neighbor nodes based on a loan appraisal source associated with one or more loans within a geo-spatial neighborhood and/or a loan originator. Server 140 may also identify one or more neighbor nodes based on detecting an appraisal source commonly associated with the neighbor node and the subject node.

In step 1514, server 140 may identify loan attributes for subject nodes. Server 140 may read the tagged data stored in the knowledge graph data structure to identify the attributes associated with the subject nodes. The attributes may have an LTV (loan to value), representing a ratio of a loan value to a determined property value. The attributes may also include an indication of a difference between LTV s of one or more loans associated with the subject node and LTVs of one or more loans associated with a neighbor node. For example, subject node may include an edge associated with loan node representing a loan value of $400,000 and a property value of $500,000, The LTV of this loan may be determined to be 0.80. The LTV of this loan may be compared with one or more other loan edges associated with the subject node. The one or more other loan edges may be selected for comparison (comp edges) based on proximity to a geo-spatial region. In some embodiments, comp edges may be selected for comparison based on a determination that the loan edges are related. Related loan edges may be identified based on a data indicating that that loan edges are commonly associated with a particular appraisal source.

In step 1516, server 140 may calculate loan edge weights for the loan edges associated with the subject node in the knowledge graph. Step 1516 is discussed in further detail below.

In step 1524, server 140 may map a plurality of subject nodes. Server 140 may read location data in the knowledge graph data structure, such as a street address, latitude/longitude coordinates associated with a loan originator representing the subject nodes, or other geographic locality information with a property associated with a loan edge, and determine spatial relationships between various loan originators based a level of activity within a geographical location.

In step 1526, server 140 may connect a subject node (such as an appraiser) and a loan node with one or more loan edges. Loan edges may represent a relationship between a subject node and loan nodes as indicated in the aggregated and received data. The loan edge may be associated with the subject node representing a loan originator and have an associated loan node LTV ratio proportional to the difference between a loan value and property value. In some embodiments, the LTV ratio (referred to also as simply "LTV") may be determined as a ratio of the loan amount and the current value of the property. As an example, a LTV of 0.8 may indicate that the loan amount is 80 percent of the current value of the property. The loan node LTV may fall within a predetermined range, such as 0.00 and 1.00, where the upper limit may represent that a loan was provided to a borrower for the full value of the property. An LTV close to the lower limit may represent that a loan was not provided to a borrower or that the loan value was very small relative to the property value. In some embodiments, server 140 may normalize all edge values before generating or updating the knowledge graph, to determine normalized edge values that are relative to all other edge values in the knowledge graph. In some embodiments, LTV may include or be replaced with other metrics that correlate attributes of a loan with the value of the property underlying the loan.

In some embodiments, server 140 may determine "neighborhoods" of entities at different levels, to enable analysis of entities and the detection of fraudulent participants within groups of different sizes. Determining such neighborhoods of different sizes may provide for increased accuracy in detecting fraudulent participants, because data for a particular appraiser may appear anomalous when compared to other appraisers in a large geographical group, whereas the same data may be within normal limits for a smaller localized region. In such embodiments, in step 1528, server 140 may identify or partition subject nodes into clusters based on the graph topology (e.g., the edge connections in the graph data structure.) For the exemplary use case of commonly associated appraisal sources in a geographical region, step 1528 may implement a hierarchical graph clustering algorithm to learn a hierarchical cluster tree structure that starts at a base level (such as at the county level for this example) and partition the subject nodes into smaller and smaller clusters that may be used for various modeling purposes. Neighbor nodes learned using this technique may be more uniform compared to computer systems using traditional zip codes, MSA codes etc to localize subject nodes. At other levels of the hierarchical cluster tree structure, server 140 may partition the subject nodes into smaller clusters based on detecting that the subject nodes in each cluster share related loan edges (comp edges). The loan edges may be identified as related based on a data indicating that a loan node is associated with a particular appraisal source. A predetermined number of related loan edges between first subject node sand a second subject node may be used to determine a strength, or affinity, of a neighbor relationship. In some embodiments, server 140 may determine that a cluster sharing fewer than a predetermined number of related loan edges is insufficient to connect the subject nodes as neighbor nodes. Step 1528 is described in more detail with respect to FIG. 15B.

Returning to step 1516, in some embodiments, server 140 may calculate comp edge weights by performing one or more of substeps 1518-1520. In step 1518, server 140 may determine a loan to value (LTV) adjustments between a subject node and a given comp. The LTV adjustments may be stored in the knowledge graph data structure as being received in the appraisal data, or may be determined by server 140. For example, server 140 may determine an LTV adjustment value to determine a multiplier value corresponding to the adjustment. An LTV adjustment may be determined by adjusting a property value based on weights and edged of neighboring nodes. In some embodiments, if an LTV is 80 percent of an appraised property value of $100,000 and the property value is determined to be $80,0000 (based on neighboring weights and edges), the adjusted LTV would be determined to be 100%. In some embodiments, server 140 may utilize only a net adjustment between a subject node and neighbor node. In other embodiments, server 140 may utilize individual adjustments corresponding to different attributes associated with a loan, and groups of adjustments defined in one or more rule sets of knowledge graph queries. The LTV adjustment value may be used to normalize the LTV for variations in appraisal values for a particular property.

In step 1520, server 140 may score the determined adjustments. In some embodiments, server 140 may apply a weight to certain LTV adjustments values to prioritize certain attributes of a property over others. For example, an LTV adjustment associated with a square footage of a property or home renovations may be assigned a higher weight than an LTV adjustment associated with a number of fireplaces. The LTV adjustment weights may be received as part of a knowledge graph traversal query, or predefined and stored in one or more databases. Furthermore, LTV adjustment weights may be adjusted for different geographical locations and/or economic inflation. Following the example above, a square footage may be weighted heavily against a number of fireplaces in a warm geographical location, but the two attributes may be assigned the same weighting in a less populated and/or colder regions where fireplaces are more desirable. The weighting values may be predetermined and stored or may be dynamically determined and updated using machine learning techniques.

In step 1522, server 140 may calculate a loan edge weight for a knowledge graph edge connecting a subject node and a loan edge and/or a neighbor edge connecting a pair of subject nodes. The edge weight may comprise a score that is based on a net adjustment value for a given comp in the stored appraisal data. In some embodiments, the edge weight may be determined based on a combination of weighted attribute adjustments, or a weighted/normalized net adjustment.

FIG. 15B shows a flowchart of an exemplary subroutine for generating a hierarchical cluster tree structure, consistent with disclosed embodiments. The subroutine may correspond to step 1528 of FIG. 15A.

In step 1530, server 140 may determine a base level of subject nodes and loan edges associated with each of the subject nodes.

In step 1532, server 140 may employ a graph clustering algorithm to identify subject node clusters corresponding to the base level. The graph clustering algorithm may include steps similar to steps 1046-1058 described with respect to FIG. 10C described above. For example, server 140 assigns a unique label to each subject node and its cluster membership. Server 140 may propagate the unique label for each subject node. The propagated information may include the node label vector multiplied by its edge weight to connected comp nodes. Server 140 may also aggregate, for each node, all of the label vectors propagated by the connected comp nodes and analyze the label vectors for each of the nodes to determine a cluster membership. The cluster membership for each of the nodes may be outputs to the hierarchical cluster tree structure.

In step 1534, server 140 may identify a plurality of clusters associated with the base level, based on the graph clustering algorithm. In the example shown, clusters 1-4 are identified at step 1534. Thus, server 140 may identify four clusters of subject nodes with loan edges associated with a certain geographical area. Server 140 may store an identification of each cluster for the first level of clusters In step 1536, server 140 may identify a base level of subject nodes and loan edges for each of clusters 1-4, shown as steps 1536-1 to 1536-4. Step 1536 may be similar to step 1530.

In step 1538, server 140 may execute the graph clustering algorithm for each of clusters 1-4, shown in FIG. 15B as 1538-1 to 1538-4. In some embodiments, server 140 may use the same graph clustering algorithm as step 1532. In other embodiments, server 140 may employ a graph clustering algorithm that is modified for the particular level of detail, such as a modified algorithm that requires greater similarity between subject nodes to identify neighbor nodes. For example, the graph clustering algorithm may determine that one or more loan edges of a first subject node are associated with a particular appraisal source. The particular appraisal source may also be associated with one or more loan edges of a second subject node. The determination that the first and second subject nodes share a predetermined number of loan edges commonly associated with a particular appraisal source may be used divide clusters 1-4 into four subclusters, representing clusters of subject nodes with loan edges associated with a common appraisal source. Each subcluster may represent a central subject node and neighbor nodes related by appraisal source information of the loan edges. Each subcluster may be further defined by a strength, or affinity, of a neighbor relationship, the strength of the neighbor relationship being defined by a number of loan edges sharing an appraisal source common to a neighbor subject node. In some embodiments, each subcluster may also be further clustered based on an average LTV value of the related loan edges or an average LTV value less than a predetermined value.

Server 140 may continue executing the graph clustering algorithm to identify additional cluster levels (not shown in figure). Once complete, in step 1542 server 140 may output a data structure having the hierarchical cluster tree structure, with cluster membership identification labels for each level of clustering. Cluster membership identification labels may be stored in the data structure for each subject node. Alternatively, in some embodiments the graph data structure may include a data structure for each cluster at least level of the tree, each data structure identifying the member nodes.

Figure 16:
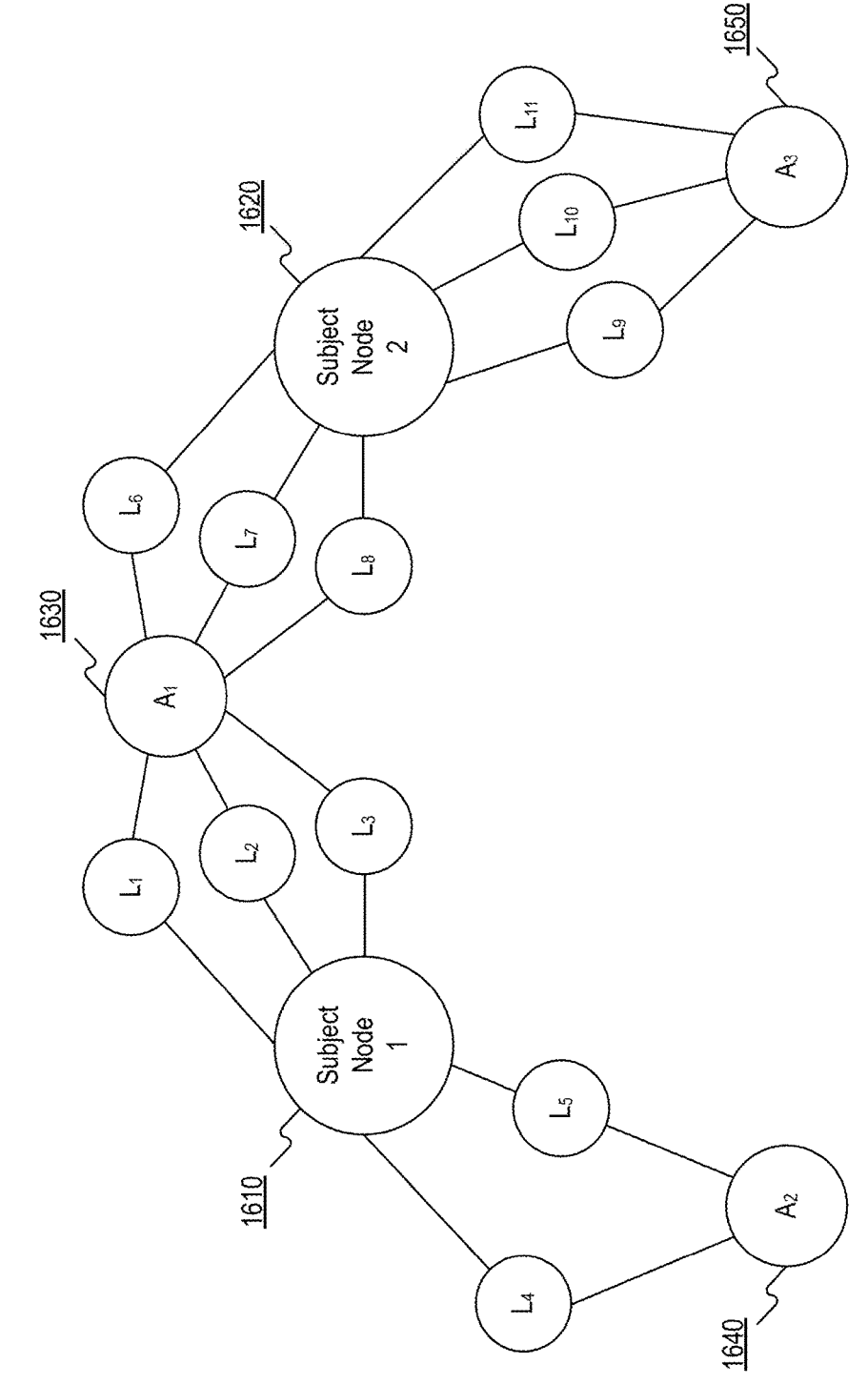
FIG. 16 illustrates a functional block diagrams depicting exemplary aspects of some embodiments of the present disclosure.

FIG. 16 illustrates a block diagram depicting an exemplary aspect of some embodiments of the present disclosure. In some embodiments, a graph 1600 implemented by system 100 may include subject nodes and loan edges. Graph 1600 may be generated using appraisal source data, loan information, appraisal value information, borrower information, loan originator information, etc. For example, in some embodiments, graph 1600 may include subject nodes 1 and 2 (1610-1620) representing a loan originator, appraisal nodes 1-3 (1630-1650) representing an appraisal source, and a plurality of loan nodes representing a loan associated with each subject node. As discussed below, in some embodiments server 140 may aggregate these types of data by generating and transmitting queries to one or more networked or local databases associated with the respective data types, or to external systems maintained by government or private entities associated with the respective data types.

For example, subject node 1610 may be associated with a plurality of loan nodes ($L_1$-$L_5$) and subject node 1620 may be associated with a plurality of loan nodes ($L_8$-$L_{11}$). Each loan node may include information identifying an appraisal source associated with each of the loan nodes. For example, loan nodes $L_1$-$L_3$ and Le-La may be associated with appraiser node 1630 (A1). A loan edge may be generated for each of loan nodes $L_1$-$L_3$ and $L_{6-8}$ connecting each loan node to the associated subject node and the commonly associated appraiser node 1630.

The determination that $L_1$-$L_3$ and $L_6$-Lgare each associated with appraiser node 1630 may cause the generation of an indication in the associated data structure that loan nodes $L_1$-$L_3$ and $L_6$-$L_8$ are related. The determination the subject nodes 1610 and 1620 are associated with related loan nodes may generate an indication that subject node 1620 and subject node 1610 are graph neighbors.

Loan nodes $L_4$-$L_5$ may be associated with appraiser node 1640 (A2). A loan edge may be generated for each of loan nodes $L_4$-$L_5$ connecting each loan node to the associated subject node and appraiser node 1640. Loan nodes $L_9$-$L_{11}$ may be associated with appraiser node 1650 (A3). A loan edge may be generated for each of loan nodes $L_9$-$L_{11}$ connecting each loan node to the associated subject node and appraiser node 1650.

Figure 17:
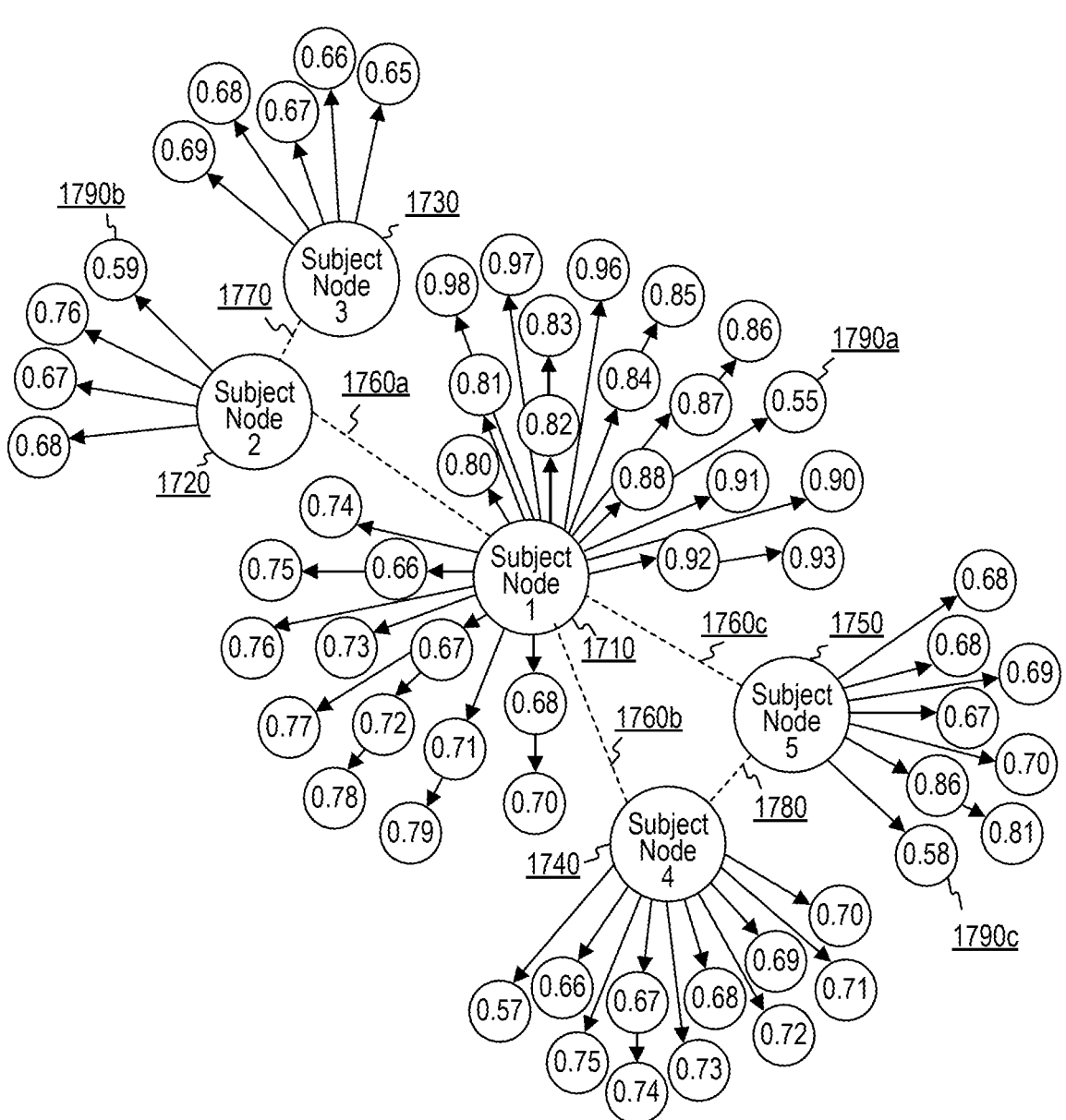
FIG. 17 illustrates an exemplary cluster diagrams for loan nodes consistent with disclosed embodiments.

FIG. 17 illustrates an exemplary cluster diagram generated using a subject knowledge graph consistent with disclosed embodiments. As shown, the diagram includes five subject nodes with neighbor edges representing a cluster of nodes.

In some embodiments, graph 1700 may include subject nodes 1-5 (1710-1750) representing loan originators, neighbor edges (1760a-1760c, 1770, and 1780) representing a relationship between loan originator subject nodes, and a plurality of loan nodes representing loans associated with each loan originator subject node.

In some embodiments, system 100, using the graph structure 1700 stored in graph database 150, can develop novel methodologies for analyzing one or more loan characteristics for a plurality of loans. By localizing clusters of nodes based on an appraisal source common to at least two subject nodes, system 100 may normalize the loan characteristics for variations in LTV to identify suspicious or fraudulent activity by a loan originator and/or appraiser. For example, subject node 1710 may be associated with a plurality of loans with LTVs. System 100 may identify a cluster of subject nodes including subject nodes 1720, 1740 and 1750 based on a determination that subject nodes 1720, 1740 and 1750 are neighbor nodes of subject node 1710. Subject nodes 1720, 1740 and 1750 may include loan nodes that share at least one common appraisal source as loan nodes associated with subject node 1710. The determination that subject nodes 1720, 1740 and 1750 are neighbor nodes of subject node 1710 may be represented by neighbor edges 1760a, 1760b, and 1760c. Subject node 1730 may be an exclusive neighbor node of subject node 1720 (represented by neighbor edge 1770), while subject node 1750 may be a neighbor node of subject node 1710 (represented by neighbor edge 1760c) and subject node 1740 (represented by neighbor edge 1780).

System 100 may analyze loan nodes associated with subject nodes connected by neighbor edges and associated with a common appraiser to determine a distribution of LTVs for each loan node common to an appraisal source. For example, in some embodiments, system 100 may determine that loan nodes associated with a first appraisal source and subject nodes 1710 and 1720 have significantly lower LTVs than loan nodes associated with the first appraisal source and subject node 1730. This may be indicative of suspicious activity and system 100 may generate and indicator representing a risk profile for the first appraisal source and loan originators associated with subject nodes 1710 and 1720.

System 100 may utilize graph traversing algorithms to detect anomalies in FIG. 17. For example, system 100 may detect loan node anomalies (subject node 1, 1790a; subject node 2, 1790b; subject node 5, 1790c), where the anomalies have a much lower LTV values than comparable loan nodes associated with each of subject node 1710, 1720, and 1750 and are commonly associated with a first appraisal source. System 100 may further detect that comparable loan nodes associated with the first appraisal source did not have anomalous LTVs.

The boundaries of cluster 1700 and subclusters may be learned and stored in a database and imported for use in place of traditional boundaries defined by zip code and political boundaries. For example, system 100 may use location information for an organization with a plurality of appraiser members across zip codes and political boundaries and/or property attributes. Moreover, system 100 may localize the boundaries for clusters by determining N degrees of separation from a central subject node, wherein N degrees of separation is measured by a number of neighbor edges separating a central subject node from other subject node in the cluster.

Figure 18:
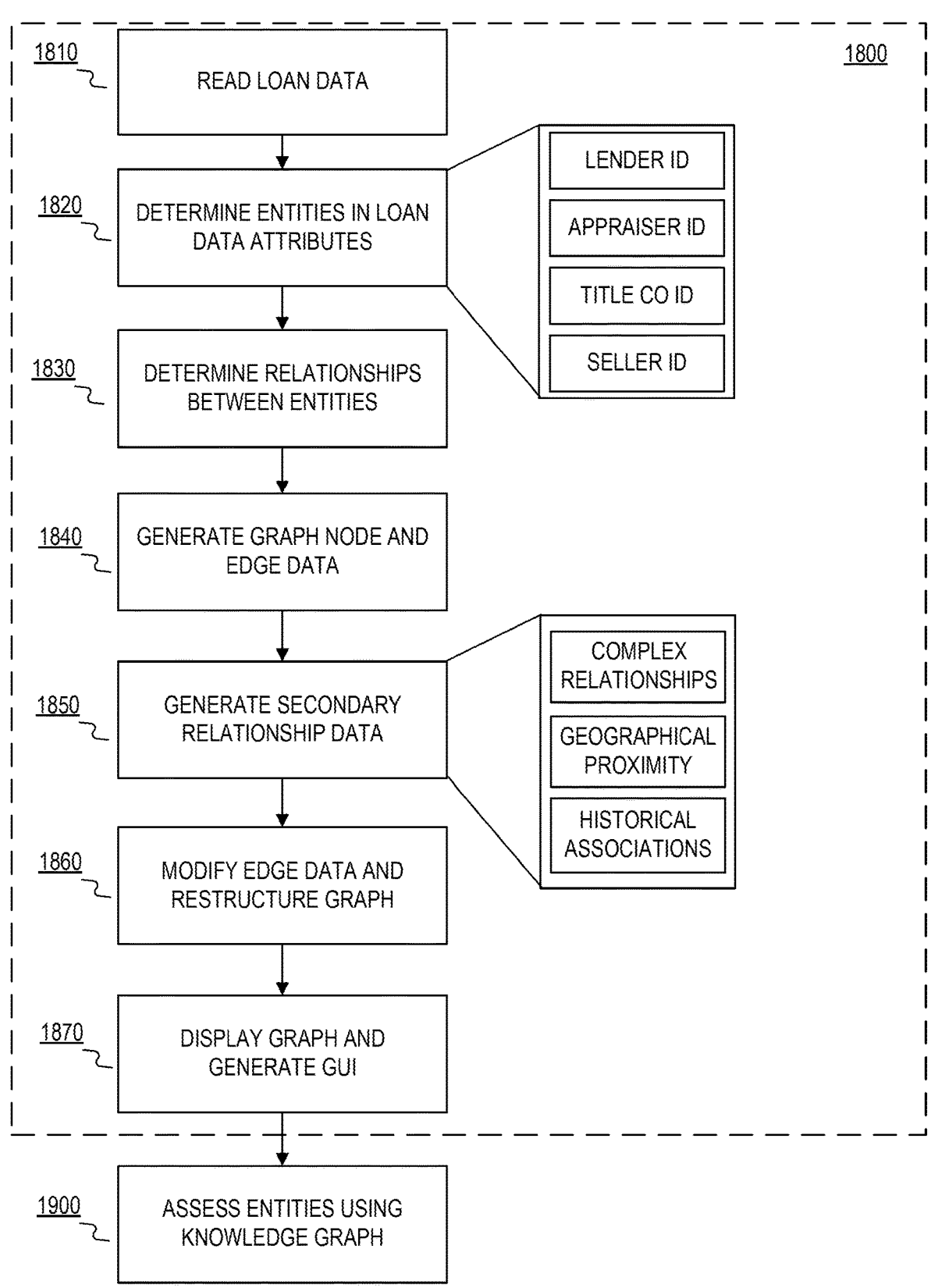
FIG. 18 shows a flowchart of an exemplary subroutine for generating a knowledge graph based on complex entity relationships.

FIG. 18 shows a flowchart of an exemplary subroutine 1800 for generating a knowledge graph based on complex entity relationships. In some embodiments, a knowledge graph may be generated representing complex relationships between entities, such as entities that both participated in the origination of the same loan or set of loans, in combination with the geographical proximity between the entities or other similar entities. Such a knowledge graph may be employed to detect trends and patterns of activity previously identified as being associated with fraud or malicious activity. Server 140 may execute subroutine 1800, and in some embodiments one or more other processors may perform some or all steps of subroutine 1800.

In step 1810, server 140 may read and aggregate loan data for a plurality of loans associated with at least one appraiser entity. Loan data may be read from one or more networked databases.

In step 1820, server 140 may determine entities in attributes of the loan data attributes. In some embodiments, attributes in the loan data may include entities that participated in the origination of particular loans, such as the lender/originator, appraiser of the property, title company associated with the loan, a seller of the underlying property, buyer of the underlying property, and any other entities associated with the particular loan.

In step 1830, server 140 may determine relationships between entities indicated in the attributes of the loan data. For example, server 140 may determine that a particular appraiser and lender/originator worked together to originate the same loan, thereby indicating that the two entities have a working relationship for at least that particular loan.

In step 1840, server 140 may generate knowledge graph node data and edge data, in which loans and entities identified in loan data may be included in node data, and relationships and associations between entities may be included in edge data.

In step 1850, server 140 may generate secondary relationship data associated with the node and edge data, and the entities and relationships underlying the node and edge data. In some embodiments, server 140 may determine complex relationships between the entities based on a combination of attributes in the loan data or data determined based on the analyzed loan data. For example, server 140 may determine transfer of funds between related entities to detect fraud and/or instances of money laundering, determine a frequency or count of loans or transactions involving the same appraiser and originator, or determine a frequency of interactions between other related entities. In some embodiments, server 140 may determine a geographical proximity between related entities. In some embodiments, server 140 may generate data regarding historical associations between entities, including a frequency of prior interactions, or individuals commonly employed by related entities, such as an individual previously employed by a particular originator that was later employed by an appraiser identified as a related entity and a graph neighbor. Server 140 may generate and store secondary relationship data in a knowledge graph data structure for the generated knowledge graph.

In step 1860, server 140 may modify edge data and restructure the generated knowledge graph based on the secondary relationship data. In some embodiments, server 140 may execute graph clustering algorithms, such as community or clique discovery algorithms, to eliminate or generate edges between nodes. Community or clique discovery algorithms may partition the graph based on edge weights to identify strong interdependencies among nodes in a data set as an indicator of potential fraud. In some embodiments, server 140 may modify edges between entities to indicate a stronger or weaker relationship between knowledge graph neighbors. For example, when secondary relationship data includes a geographical proximity between graph neighbors, server 140 may modify edge data between the entities to indicate a stronger or weaker relationship between the entities that is directly proportionate to the determined geographical proximity.

In step 1870, server 140 may display the modified knowledge graph and generate a graphical user interface (such as the GUI illustrated in FIG. 20) to provide an easy-to-understand interface illustrating entities and relationships between entities in the loan data. In some embodiments, the displayed knowledge graph may color code entities, or display consistent symbols for various entity types, to differentiate between entity types in a knowledge graph. In some embodiments, the graphical user interface may be enabled to allow one or more users to selectively expand the displayed knowledge graph using radial buttons. For example, a loan originator node or button may be expanded to display all loan originators included in the displayed knowledge graph.

Figure 19:
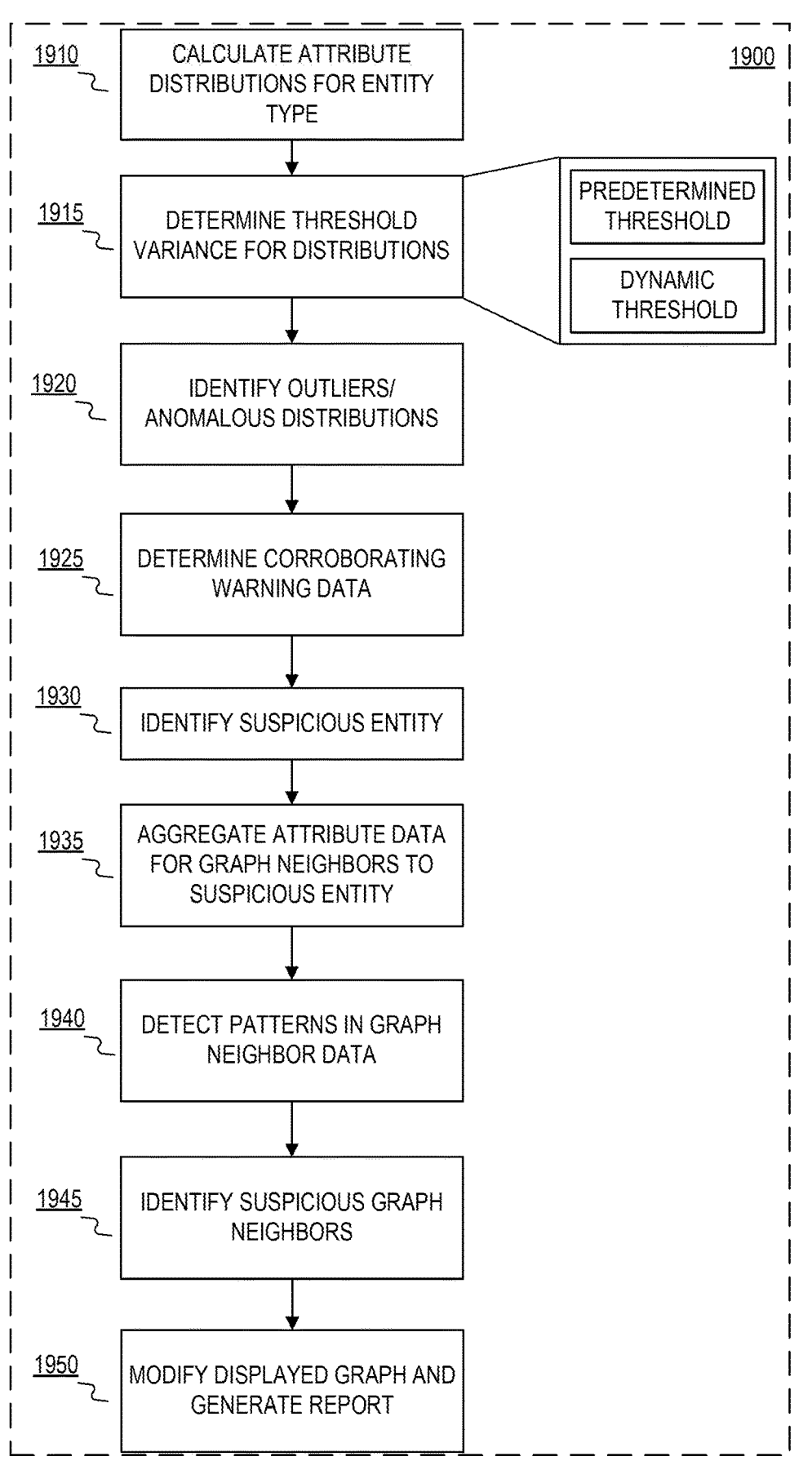
FIG. 19 shows a flowchart of an exemplary subroutine for assessing entities using knowledge graphs to generate a visualization of suspicious entities.

Following the steps of subroutine 1800, in step 1900 server 140 may employ the generated knowledge graph to generate secondary information regarding determined entities, and assess those entities using the knowledge graph, as described in further detail with respect to FIG. 19.

FIG. 19 shows a flowchart of an exemplary subroutine 1900 for assessing entities using knowledge graphs to generate a visualization of suspicious entities.

In step 1910, server 140 may calculate attribute distributions for a first entity type of entities in the knowledge graph. For example, server 140 may query data associated with all appraiser entities in a generated knowledge graph, and calculate distributions of a particular attribute for the appraisers. In some embodiments, the distributions may include a distribution of Loan-to-Value (LTV) ratios associated with loans in which a particular appraiser was involved. In some embodiments, the distribution may involve an attribute that is shared between two particular entities, such as a distribution of LTV ratios for all loans involving a particular combination of appraiser and originator, or appraiser and seller. In some embodiments, server 140 may determine statistics other than a distribution, such as a mean or median LTV ratio for loans originated between a pair of a particular appraiser and originator. Server 140 may determine such statistics for each entity in the knowledge graph, or each entity within a certain neighborhood of the knowledge graph.

In step 1915, server 140 may determine a threshold variance for calculated distributions. In some embodiments, a threshold may be predetermined for a particular neighborhood or knowledge graph, and in some embodiments a threshold may be determined dynamically based on a statistical analysis of data in the knowledge graph to determine confidence levels or standard deviations. In some embodiments, in step 1915 server 140 may determine other thresholds such as a threshold frequency of loans having a particularly high LTV, or a threshold frequency of loans having a LTV that would be considered ideal in the industry. High frequencies of loans having "perfect" characteristics may raise suspicion that fraud was involved in the loan origination, when the geographical market exhibits a normal level of variance in LTV values for any given appraiser.

In step 1920, server 140 may identify outliers and/or anomalous distributions by determining whether the calculated distributions from step 1910 exceed the threshold variance(s) determined in step 1915. For example, server 140 may determine that a particular appraiser entity issues loans having an "ideal" LTV of 0.8 in every instance in which the appraiser originates a loan with a particular originator. This statistic may exceed the exemplary threshold limit of 75% of loans exhibiting a LTV of 0.8. Accordingly, the appraiser may be identified as having an anomalous distribution in relation to other appraisers in the graph neighborhood. When a hierarchical clustering algorithm is employed to generate graph neighborhoods of different levels, server 140 may evaluate the distributions in relation to different thresholds determined for each neighborhood level, to determine whether the anomaly is present at multiple neighborhood levels.

In step 1925, server 140 may determine corroborating warning data associated with the anomalous distribution. For example, an appraiser associated with an anomalous distribution may have been flagged in the past as committing fraud, or having suspicious prior activity. Corroborating warning data may be determined based on additional queries for attributes in the loan data, or based on one or more queries for additional data from networked databases or third party systems.

In step 1930, server 140 may identify one or more suspicious entities based on the results of the preceding steps. For example, using graph clustering algorithms, server 140 may determine that an entity having anomalous attribute distributions exceeding one or more thresholds, alone or in combination with corroborating warning data. Suspicious entities may be considered entities in the knowledge graph that may be involved in fraudulent activity.

In step 1935, server 140 may aggregate attribute data for graph neighbors to the identified suspicious entity. In some embodiments, server 140 may identify entities indicated in the knowledge graph as graph neighbors to the suspicious entity, based on edge data and relationships reflected in the loan data such as common participants in the origination of a loan.

In step 1940, server 140 may detect patterns in the aggregated graph neighbor data. In some embodiments, server 140 may determine whether data associated with graph neighbors indicates historical suspicious activity, or anomalous attribute distributions and statistics similar to those of the suspicious entity.

In step 1945, server 140 may identify suspicious graph neighbors, based on the identification of graph neighbors to the suspicious entity, alone or in combination with detected patterns in the graph neighbor's data determined in step 1940.

In step 1950, server 140 may modify the displayed knowledge graph and generate a report indicating detected fraudulent activity and suspicious entities based on the preceding steps. In some embodiments, server 140 may modify the appearance of identified suspicious entities to color code the entities or otherwise highlight them in the knowledge graph, to provide an easy-to-understand indication to users of identified fraudulent activity in the knowledge graph. In some embodiments, server 140 may generate a report indicating the identified suspicious entities and the details underlying the relevant determination. For example, the generated report may include a summary or description of loans associated with the suspicious entities which may include expected costs associated with a default.

Figure 20:
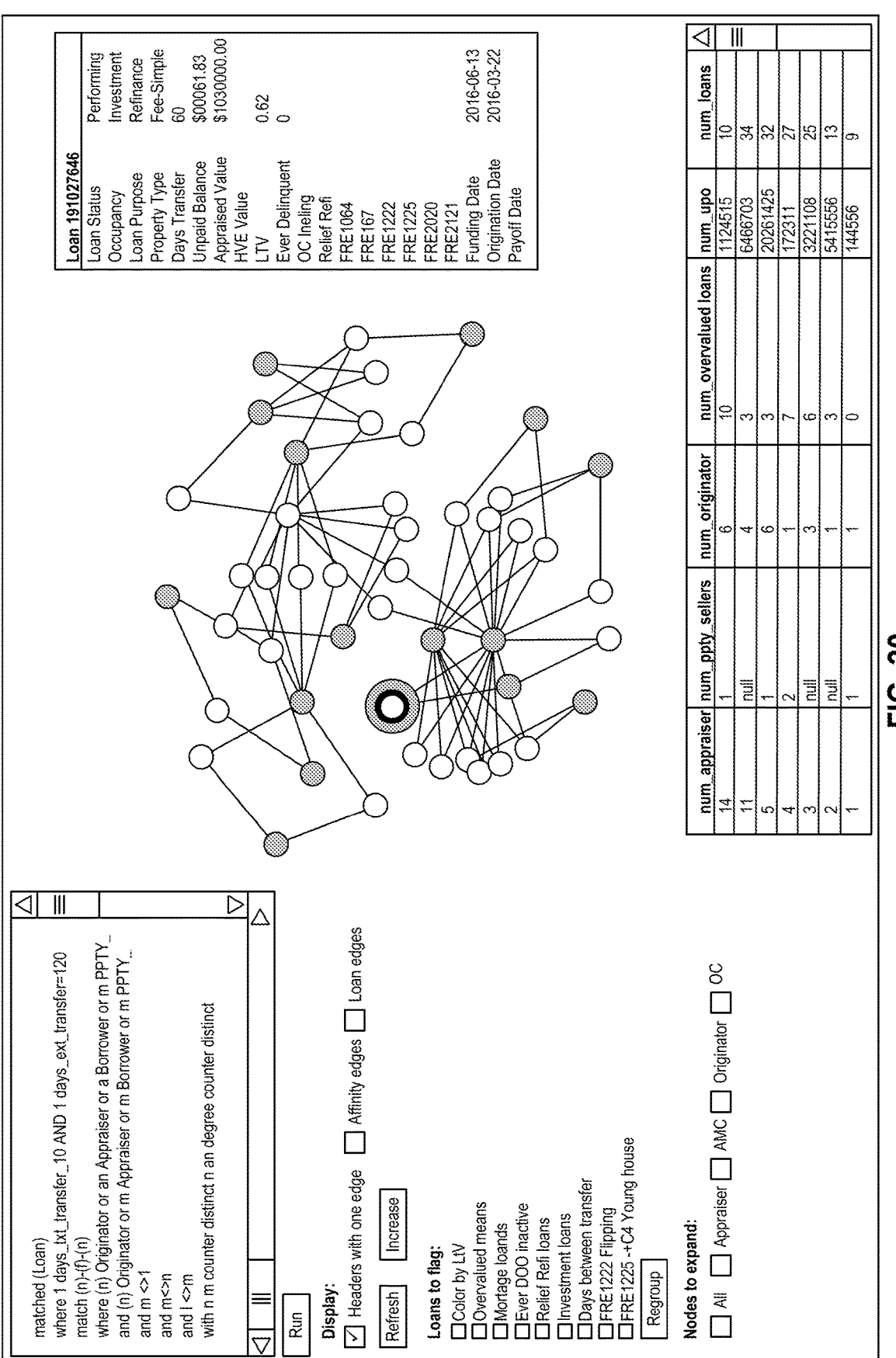
FIG. 20 illustrates an exemplary graphical user interface for visualizing suspicious entities.

FIG. 20 illustrates a graphical user interface for graph visualization, such as for visualizing suspicious entities in a generated knowledge graph. In some embodiments, visualization 2000 may include a display of a topology of a generated graph. The graph may be generated based on one or more characteristic indicated by a user or operator of the graphical user interface. In some embodiments, the graph may be generated by seeding the graph and/or associated data with known or suspected occurrences of fraud, or by providing an indication of a known/suspected malicious appraiser or other participant. Seeding may include adding one or more visual indicators to the graph, thus enabling a user to traverse the graph the identify patterns or trends between the visual indicators and one or more objects included in visualization 2000. The one or more objects may include one or more nodes connected by one or more edges.

Visualization 2000 may be configured to receive user input for expanding and/or compressing nodes or edges, wherein an expanded view includes a first level of information and a compressed view includes a second level of information. In some embodiments, the graphical user interface may receive input for expanding/compressing all objects. In some embodiments, the graphical user interface may receive input for selecting expanding/compression one or more objects indicated by the input. Each level of information may include information related to one or more properties of the one or more objects.

For example, in some embodiments, visualization 2000 may include a compressed view. The compressed view may include an overview of a central subject node and one or more neighbor nodes. The compressed view may also include a risk profile for the central subject node, wherein the risk profile includes one or more indicators of suspicious activity. In some embodiments, visualization 2000 may include an expanded view. The expanded view may include details regarding the risk profile including one of more appraisal source objects flagged by system 100. The expanded view may also include an identification of one or more transaction objects flagged by system 100. Flagged objects may include information related to data causing the object to be flagged. Such data may include a date/time of a transaction, an LTV value, a predetermined affinity with a related flagged object, a confirmed occurrence of fraud, a suspected occurrence of fraud, quality control defects, appraisal values exceeded actual values by a predetermined threshold difference, association frequency, a period of time between an initial application and a refinancing application, etc. The expanded view may also include information for identifying one or more individuals of organization represented by the central subject number, neighboring nodes, appraisal sources, etc.

In some embodiments, visualization 2000 may include one or more additional features such as query boxes, visualization controls, information boxes, and/or statistics box. A user may provide input to a query box to initiate generation of a report based on the input. Additionally, or alternatively, a user may provide one or more indications using the visualization controls. For example, the visualization controls may include settings for modifying the appearance of a particular region of the generated graph, expanding/compression the one or more objects, indicating which of a plurality of object/properties to include in visualization 2000, one or more more criteria by which to analyze data represented by visualization 2000 for irregularities. Additionally, or alternatively, the information box may provide one or more levels of detail related to the objects displayed by visualization 2000 or selected by a user. Additionally, or alternatively, the statistics box may include information related to a generated report. For example, in some embodiments, a user may indicate a first loan originator for representing the central subject node. System 100 may analyze aggregated entity data and generate a report. The statistics box may represent statistics associated with the report. The statistics box may include statistics or values for a number of variables associated with the first loan originator including, for example, a number of appraisers, a number of property sellers, a number of overvalues loans, a number of loan attributed to the first loan originator. In some embodiments, the report may be generated for a plurality of loan originators; accordingly, the statistics box may also include an information identifying the loan originator corresponding to the statistics.

In some embodiments, visualization 2000 may color code or highlight various entities displayed on the knowledge graph, to provide an easy-to-understand indication of detected suspicious entities and potential fraudulent loans. Visualization 2000 may also modify the appearance of nodes and edges to emphasize those most relevant to the user's query, such as by enlarging potentially fraudulent appraisers and automatically modify the color(s) of edges connecting the fraudulent appraiser to other suspicious actors associated with the detected fraud. Considering the massive quantity of loan data and subject nodes associated with the processed loan data, visualization 2000 may provide an easy-to-understand interface for a user having minimal programming or statistical knowledge, to quickly learn about fraud detected based on pattern detection and statistical analysis of aggregated loan data, as well as quickly learning about suspicious activity associated with the fraud as determined based on knowledge graph relationships.

Visualization 2000 may be generated based on data located one or more of third party database 160, graph database 150, and/or graph server 140. System 100 may also be configured to receive from and transmit data to a back-end server. The back-end server may aggregate data from one or more data sources and execute instruction for securing one or more pieces of confidential data. The confidential data may be secured using a masking process, wherein the identifies of one or more individuals associated with the data is tokenized and/or encrypted. The masked data may be transmitted for cleaning and/or preparation to ensure that the masked data conforms to a predetermined format compatible for analysis by system 100. In some embodiments, the masked data may be structured according to a format predetermined by a data structure. The masked data may also include a security key. The security key may enable one or more authorized users to unmask the data to identify the one or more individuals associated with the data. In some embodiment, a user may detect, based on an analysis of data associated with a first loan originator and included in visualization 2000, that the first loan originator is associated with an appraiser suspected of fraud. The user may authorize the unmasking of the identity of the first originator so that remedial action may be taken.

The graphical user interface may also be configured to export visualization 2000 and/or data represented by the visualization, to another file format. In some embodiments, some or all of the logic for the graphical user interface may be implemented as a computer program, application, or as a plug-in module or subcomponent of another application. The described graphical user interface may be varied and are not limited to the examples or descriptions provided.

The specification has described systems and methods for home knowledge graph representation and analysis. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A knowledge graph computer system, comprising:
at least one processor;
at least one database communicatively connected to the at least one processor; and
a memory storing executable instructions which, when executed, cause the at least one processor to perform operations including:
    building a knowledge graph having a plurality of subject nodes corresponding to the plurality of subjects and a plurality of loan nodes corresponding to attribute information;
    generating a hierarchical cluster tree structure by:
        identifying a first cluster of subject nodes associated with a first level of the hierarchical cluster tree structure;
        determining, for each subject node in the first cluster, at least one vector proportionate to a first loan edge weight associated with a respective property;
        identifying a first subcluster of subject nodes associated with the first cluster of the hierarchical cluster tree structure;
        determining, for each loan node in the first subcluster, at least one vector proportionate to a first neighbor edge weight associated with the respective subject node; and
        generating the hierarchical cluster tree structure based on the identified first cluster of subject nodes, the identified first subcluster of subject nodes, the determined at least one vector proportionate to the first loan edge weight, and the determined at least one vector proportionate to the first neighbor edge weight:
    determining, using a machine learning analysis, a geo-spatial neighborhood delineation based on the generated hierarchical cluster tree structure, wherein the machine learning analysis includes classification training through pruning noisy clusters through generalization; and
    updating, using the machine learning analysis, the knowledge graph by changing an identified neighborhood for one or more homes represented as nodes on the knowledge graph based on the determined geo-spatial neighborhood delineation.

2. The knowledge graph computer system of claim 1, wherein the determined loan edge weight is directly proportional to a degree of similarity between a first loan node characteristic for a first node and an average loan node characteristic for the plurality of loan nodes associated with a first subject node.

3. The knowledge graph computer system of claim 1, the operations further comprising:
receiving geographic location information for a property associated with a first loan node; and
determining, using the hierarchical cluster tree structure and based on the received geographic location information, a cluster of loan nodes to which the first loan node belongs.

4. The knowledge graph computer system of claim 1, the operations further comprising:
receiving appraisal source information for a plurality of loan nodes associated with a plurality of subject nodes of a first cluster; and
determining, using the hierarchical cluster tree structure and based on the received appraisal source information, a subcluster of subject nodes, wherein each of the subject nodes of the subcluster includes at least one loan node associated with a first appraisal source.

5. The knowledge graph computer system of claim 1, wherein determining the at least one vector proportionate to the first neighbor edge weight further comprises determining a number of loan nodes of a first subject node commonly associated with an appraisal source of a second subject node in the first cluster.

6. The knowledge graph computer system of claim 1, wherein each loan node in the first subcluster includes attribute information identifying a loan to value ratio.

7. The knowledge graph computer system of claim 1, the operations further comprising calculating the loan edge weight based on at least one of a combination of weighted attribute adjustments or a weighted net adjustment.

8. A computer-implemented method comprising:
building a knowledge graph having a plurality of subject nodes corresponding to the plurality of subjects and a plurality of loan nodes corresponding to attribute information;
generating a hierarchical cluster tree structure by:
    identifying a first cluster of subject nodes associated with a first level of the hierarchical cluster tree structure;
    determining, for each subject node in the first cluster, at least one vector proportionate to a first loan edge weight associated with a respective property;
    identifying a first subcluster of subject nodes associated with the first cluster of the hierarchical cluster tree structure;
    determining, for each loan node in the first subcluster, at least one vector proportionate to a first neighbor edge weight associated with the respective subject node; and
    generating the hierarchical cluster tree structure based on the identified first cluster of subject nodes, the identified first subcluster of subject nodes, the determined at least one vector proportionate to the first loan edge weight, and the determined at least one vector proportionate to the first neighbor edge weight;
determining, using a machine learning analysis, a geo-spatial neighborhood delineation based on the generated hierarchical cluster tree structure, wherein the machine learning analysis includes classification training through pruning noisy clusters through generalization; and updating, using the machine learning analysis, the knowledge graph by changing an identified neighborhood for one or more homes represented as nodes on the knowledge graph based on the determined geo-spatial neighborhood delineation.

9. The computer-implemented method of claim 8, wherein the determined loan edge weight is directly proportional to a degree of similarity between a first loan node characteristic for a first node and an average loan node characteristic for the plurality of loan nodes associated with a first subject node.

10. The computer-implemented method of claim 8, further comprising:

receiving geographic location information for a property associated with a first loan node; and determining, using the hierarchical cluster tree structure and based on the received geographic location information, a cluster of loan nodes to which the first loan node belongs.

11. The computer-implemented method of claim 8, further comprising:

receiving appraisal source information for a plurality of loan nodes associated with a plurality of subject nodes of a first cluster; and determining, using the hierarchical cluster tree structure and based on the received appraisal source information, a subcluster of subject nodes, wherein each of the subject nodes of the subcluster includes at least one loan node associated with a first appraisal source.

12. The computer-implemented method of claim 8, wherein determining the at least one vector proportionate to the first neighbor edge weight further comprises determining a number of loan nodes of a first subject node commonly associated with an appraisal source of a second subject node in the first cluster.

13. The computer-implemented method of claim 8, wherein each loan node in the first subcluster includes attribute information identifying a loan to value ratio.

14. The computer-implemented method of claim 8, further comprising calculating the loan edge weight based on at least one of a combination of weighted attribute adjustments or a weighted net adjustment.

15. A non-transitory computer readable medium storing instructions which, when executed, cause at least one processor to perform operations comprising:

at least one processor;

building a knowledge graph having a plurality of subject nodes corresponding to the plurality of subjects and a plurality of loan nodes corresponding to attribute information;

generating a hierarchical cluster tree structure by:

identifying a first cluster of subject nodes associated with a first level of the hierarchical cluster tree structure;

determining, for each subject node in the first cluster, at least one vector proportionate to a first loan edge weight associated with a respective property;

identifying a first subcluster of subject nodes associated with the first cluster of the hierarchical cluster tree structure;

determining, for each loan node in the first subcluster, at least one vector proportionate to a first neighbor edge weight associated with the respective subject node; and generating the hierarchical cluster tree structure based on the identified first cluster of subject nodes, the identified first subcluster of subject nodes, the determined at least one vector proportionate to the first loan edge weight, and the determined at least one vector proportionate to the first neighbor edge weight;

determining, using a machine learning analysis, a geo-spatial neighborhood delineation based on the generated hierarchical cluster tree structure, wherein the machine learning analysis includes classification training through pruning noisy clusters through generalization; and updating, using the machine learning analysis, the knowledge graph by changing an identified neighborhood for one or more homes represented as nodes on the knowledge graph based on the determined geo-spatial neighborhood delineation.

16. The non-transitory computer readable medium of claim 15, wherein the determined loan edge weight is directly proportional to a degree of similarity between a first loan node characteristic for a first node and an average loan node characteristic for the plurality of loan nodes associated with a first subject node.

17. The non-transitory computer readable medium of claim 15, the operations further comprising:

receiving geographic location information for a property associated with a first loan node; and determining, using the hierarchical cluster tree structure and based on the received geographic location information, a cluster of loan nodes to which the first loan node belongs.

18. The non-transitory computer readable medium of claim 15, the operations further comprising:

receiving appraisal source information for a plurality of loan nodes associated with a plurality of subject nodes of a first cluster; and determining, using the hierarchical cluster tree structure and based on the received appraisal source information, a subcluster of subject nodes, wherein each of the subject nodes of the subcluster includes at least one loan node associated with a first appraisal source.

19. The non-transitory computer readable medium of claim 15, wherein determining the at least one vector proportionate to the first neighbor edge weight further comprises determining a number of loan nodes of a first subject node commonly associated with an appraisal source of a second subject node in the first cluster.

20. The non-transitory computer readable medium of claim 15, wherein each loan node in the first subcluster includes attribute information identifying a loan to value ratio.

* * * * *